United States Patent [19]

McDonough

[11] Patent Number: 5,778,024
[45] Date of Patent: Jul. 7, 1998

[54] DUAL-MODE COMMUNICATIONS PROCESSOR

[75] Inventor: John G. McDonough, San Diego, Calif.

[73] Assignee: Qualcomm Incorporated, San Diego, Calif.

[21] Appl. No.: 595,319

[22] Filed: Feb. 1, 1996

[51] Int. Cl.[6] .................................................. H04L 27/32
[52] U.S. Cl. ........................ 375/216; 375/222; 455/553; 364/DIG. 1; 364/DIG. 2; 364/135; 364/180
[58] Field of Search ........................ 375/216, 219, 375/220, 222, 223, 240, 259, 271, 283, 302, 316, 322, 346, 349, 377; 379/58, 59, 93.28; 455/33.1, 84, 550, 553, 557, 102; 704/200; 364/232.8, 232.9, 948.1, 135, 180

[56] References Cited

U.S. PATENT DOCUMENTS

| | | | |
|---|---|---|---|
| 4,905,301 | 2/1990 | Krolopp et al. | 455/34 |
| 4,972,455 | 11/1990 | Phillips et al. | 379/59 |
| 5,008,925 | 4/1991 | Pireh | 379/60 |
| 5,020,092 | 5/1991 | Phillips et al. | 379/59 |
| 5,020,093 | 5/1991 | Pireh | 379/59 |
| 5,128,959 | 7/1992 | Bruckert | 375/1 |
| 5,173,941 | 12/1992 | Yip et al. | 381/36 |
| 5,251,232 | 10/1993 | Nonami | 375/216 |
| 5,335,355 | 8/1994 | Tanaka et al. | 455/33.1 |
| 5,442,806 | 8/1995 | Barber | 455/33.1 |
| 5,550,893 | 8/1996 | Heidari | 379/59 |
| 5,590,378 | 12/1996 | Thayer et al. | 395/850 |
| 5,592,556 | 1/1997 | Schwed | 380/49 |
| 5,617,423 | 4/1997 | Li et al. | 370/426 |

OTHER PUBLICATIONS

E. Vanzieleghem et al. "A Compact and Power Efficient GSM Vocoder", 1993 IEEE, pp. 207–211, 1993.

*Primary Examiner*—Stephen Chin
*Assistant Examiner*—Amanda T. Le
*Attorney, Agent, or Firm*—Russell B. Miller; Roger W. Martin

[57] ABSTRACT

A dual-mode communications processor disposed to be incorporated within a dual-mode communications device is disclosed herein. The dual-mode communications processor comprises a dual-mode voiceband signal processor having an input port for receiving digitized data. Within the dual-mode voiceband signal processor, first and second signal processing operations are performed upon the digitized data received during operation in first and second modes, respectively. These separate signal processing operations may advantageously be performed using common circuit elements within the dual-mode voiceband signal processor. In an exemplary embodiment the first signal processing operation is performed in accordance with a predefined vocoding algorithm, while the second signal processing operation involves the filtering of the digitized data as prescribed by FM cellular telephone standards. The dual-mode communications processor further includes a digital modulation modem coupled to the dual-mode voiceband signal processor. The digital modulation modem generates digital modulation data using the digitized data processed by the dual-mode voiceband signal processor during operation in the first mode. An FM modulator, also coupled to the dual-mode voiceband signal processor, generates FM modulation data using the digitized data processed by the dual-mode voiceband signal processor during operation in the second mode. A controller is provided for selecting between operation in the first and second modes. A dual-mode port allows the digitized data to be transferred to and from a dual-mode interface buffer over a common signal path during operation in both the first and second modes.

18 Claims, 10 Drawing Sheets

DUAL-MODE COMMUNICATIONS PROCESSOR

BACKGROUND OF THE INVENTION

I. Field of the Invention

The present invention relates generally to portable communications devices, such as cellular telephones. More particularly, the present invention relates to a novel and improved communications processor for use in a fixed or portable communications device disposed for operation in two or more modes.

II. Description of the Related Art

With the ever increasing popularity of cellular telephony, it has become necessary to provide more channels in the allocated cellular frequencies. Up until recently, existing cellular telephone systems have been comprised exclusively of "analog voice" systems. In this type of system, an analog voice signal is used to modulate a radio frequency (RF) carrier or intermediate frequency (IF) signal. However, "digital voice" systems have recently been developed in which analog communication signals are processed using digital signal processing techniques. In this type of system, the analog voice signal is first digitized and is then used to modulate either an RF carrier or an IF signal. Some digital cellular telephone systems being developed, such as code-division multiple access (CDMA) systems, use spread spectrum techniques.

For spread spectrum systems such as CDMA, various approaches have been developed for coding the input digitized speech waveform. This coding has been shown to increase channel capacity by allowing the use of lower average data rates. When conventional sampling techniques are used in the absence of such coding, a transmission data rate on the order of 64 kilobits per second (kpbs) is required to achieve the speech quality of conventional analog telephones. Through the use of speech analysis, followed by the appropriate coding, transmission, and synthesis at the receiver, a significant reduction in the transmission data rate can be achieved. Apparatus that perform speech analysis and coding at the transmitter and synthesis at the receiver are known as vocoders.

The recent development of digital cellular telephone standards and systems have spurred the need for vocoders. Specifically, efforts have been directed toward development of advanced vocoding algorithms which efficiently use the available transmission bandwidth and enable accurate reproduction of the source speech at the receiver. One such improved vocoding algorithm has been termed variable rate code excited linear prediction (CELP), and is detailed in co-pending patent application Ser. No. 08/004,484, filed Jan. 14, 1993, now U.S. Pat. No. 5,414,796, entitled VARIABLE RATE VOCODER and assigned to the assignee of the present invention. An application specific integrated circuit (ASIC) implementation of the CELP algorithm detailed in the aforementioned copending U.S. Patent Application is disclosed in the copending U.S. patent application Ser. No. 08/197,417, entitled VOCODER ASIC, which is also assigned to the assignee of the present invention. The disclosures of both of these copending patent applications are herein incorporated by reference.

Another trend in the cellular telephone industry is toward the development of so-called "dual-mode" systems. One particular type of dual-mode system is being designed for operation in both a digital modulation mode (e.g., a CDMA mode), as well as in a frequency modulation (FM) mode. In the most straightforward proposed implementations of such CDMA/FM and other dual-mode systems, separate circuitry is employed for processing the digitized speech information during each mode of operation. For example, it has been proposed that dedicated hardware be provided for implementing the vocoding operation during the digital modulation mode of operation, and that separate dedicated hardware be used to perform FM processing. One such proposed implementation of an advanced variable rate CELP vocoder is described in the above-referenced copending patent application. This advanced vocoder ASIC provides significant advantages over other possible implementations in terms of cost, size, and power consumption etc. For "CDMA-only" systems, this vocoder ASIC provides an efficient realization for the voiceband signal processing requirements. For the dual-mode systems described above, the voiceband processing requirements are two-fold insofar as both vocoding and FM audio processing specifications are implicated. Providing separate audio processing circuitry for utilization during digital modulation and FM modes adds to the complexity and expense of such dual-mode portable communication devices relative to single-mode systems.

Dual-mode designs relying upon separate voiceband processing circuitry for each mode are inherently complex and expensive. The increased complexity and area requirements of these dual-mode implementations inhibits efforts to incorporate the signal processing functions for both modes onto a single ASIC. In one aspect of the invention, an architecture is provided which enables a vocoding operation to be carried out using hardware identical to that employed to perform the audio band signal processing required by FM cellular telephone systems. This architecture has enabled the development of a dual-mode ASIC for use in dual-mode portable communication devices. The ASIC and architecture are believed to represent significant advances in the state of the art.

SUMMARY OF THE INVENTION

In one aspect, the present invention comprises a dual-mode communications processor disposed to be incorporated within a dual-mode communications device. The dual-mode communications processor comprises a dual-mode voiceband signal processor having an input port for receiving digitized data. Within the dual-mode voiceband signal processor, first and second signal processing operations are performed upon the digitized data received during operation in first and second modes, respectively. These separate signal processing operations may advantageously be performed using common circuit elements within the dual-mode voiceband signal processor. In an exemplary embodiment the first signal processing operation is performed in accordance with a predefined vocoding algorithm, while the second signal processing operation involves the filtering of the digitized data as prescribed by FM cellular telephone standards.

The dual-mode communications processor further includes a digital modulation modem coupled to the dual-mode voiceband signal processor. The digital modulation modem generates digital modulation data using the digitized data processed by the dual-mode voiceband signal processor during operation in the first mode. An FM modulator, also coupled to the dual-mode voiceband signal processor, generates FM modulation data using the digitized data processed by the dual-mode voiceband signal processor during operation in the second mode. A controller is provided for selecting between operation in the first and second modes.

In the exemplary embodiment a first interface is connected between the digital modulation modem and a first port of the dual-mode voiceband signal processor. A second interface is connected between the FM modem and a second port of the dual-mode voiceband signal processor. In addition, a dual-mode port allows the digitized data to be transferred to and from a dual-mode interface buffer over a common signal path during operation in both the first and second modes. The controller directs the modes of operation of the dual-mode interface buffer.

In another aspect, the present invention comprises a dual-mode voiceband signal processor disposed for incorporation within a dual-mode communications device. The dual-mode voiceband signal processor includes a digital signal processor (DSP) for performing a vocoding operation during operation of the dual-mode communications device in the first mode, and for performing a predefined signal processing function during operation of the device in the second mode. In the first mode, the DSP of the dual-mode voiceband signal processor is configured to perform a variable rate CELP vocoding operation. A minimization processor is provided to aid in the performance of computationally intensive portions of the CELP vocoding operation. In the second mode, the DSP of the dual-mode voiceband signal processor is configured to perform the digital audio processing required by FM cellular telephone standards.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
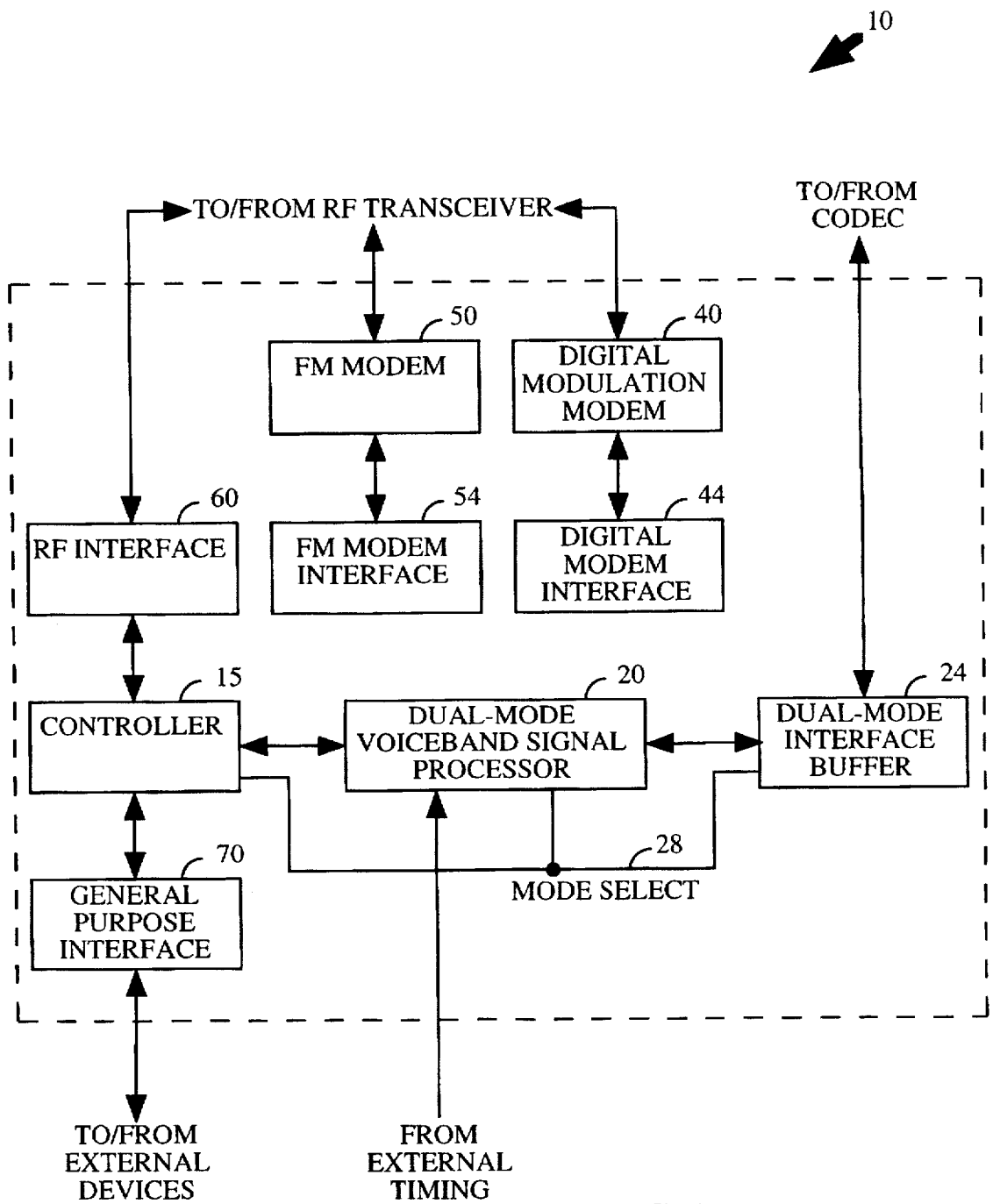
FIG. 1 is a block diagram of an exemplary embodiment of a dual-mode communications processor of the present invention.

The present invention provides an architecture for a dual-mode modulator/demodulator, or "modem", capable of being implemented as an ASIC. In an FM mode, the dual-mode communications processor operates as a modulator to generate FM data on the basis of digitized samples, and as a demodulator to extract digitized samples from received FM data. In a digital modulation mode, prior to modulation, digitized samples are encoded in accordance with an advanced vocoding algorithm. The encoded samples are then modulated to generate digital modulation data which may then be applied in conjunction with frequency, time and/or code division spread spectrum radio techniques to generate a resultant spread spectrum transmission waveform. During demodulation in the digital modulation mode, the encoded samples are recovered from the received spread spectrum waveform. The dual-mode communications processor then performs a decoding operation in accordance with the advanced vocoding algorithm mentioned above.

In a preferred embodiment, modulation and demodulation are performed during operation of the dual-mode communications processor in the FM mode using methods described in copending U.S. patent application Ser. No. 08/373,122, filed Dec. 4, 1994, and entitled DUAL-MODE DIGITAL FM COMMUNICATION SYSTEM, which is assigned to the assignee of the present invention, and which is herein incorporated by reference. In the FM mode, the digitized samples are filtered, interpolated, and then used to modulate an RF carrier. In accordance with one aspect of the invention, the vocoder hardware described within the aforementioned copending U.S. patent application Ser. No. 08/197,417 is adapted for FM and digital modulation processing during operation in both the FM and digital modulation modes respectively. This sharing of signal processing resources within the vocoder hardware advantageously facilitates realization of the inventive dual-mode communications processor as a monolithic integrated circuit.

During operation of the dual-mode communications processor in the digital modulation mode, the digitized samples are initially processed using the CELP algorithm detailed in the aforementioned copending U.S. patent application Ser. No. 08/004,484. The resultant processed samples may then be encoded for transmission via an RF carrier using conventional frequency, time and/or code division spread spectrum radio techniques. As an example, the samples may be encoded for radio transmission in a code-division multiple access (CDMA) communication system of the type described in U.S. Pat. No. 4,901,307, entitled "SPREAD SPECTRUM MULTIPLE ACCESS COMMUNICATION SYSTEM USING SATELLITE OR TERRESTRIAL REPEATERS", which is assigned to the assignee of the present invention, and which is herein incorporated by reference.

Although in the preferred embodiment the inventive dual-mode communications processor is designed for operation in "FM" and "digital modulation" modes, the teachings of the invention encompass dual-mode communications processors configured for operation in other modes as well. For example, the inventive dual-mode communications processor may be adapted for use within a dual-mode wireless telephone operative in both time division multiple access (TDMA) and CDMA modes. In this instance the dual-mode voiceband signal processor within the dual-mode communications processor would, for example, be configured to perform the potentially different vocoding operations associated with each mode of operation. Given the anticipated proliferation of both TDMA, CDMA and other systems, it is expected that this alternate embodiment of the present invention may be of significant utility in the near term.

Turning now to FIG. 1, a block diagram is provided of an exemplary embodiment of dual-mode communications processor 10 of the present invention. In the preferred embodiment dual-mode communications processor 10 is designed to be implemented as an integrated circuit on a single semiconductor chip, generally indicated by the reference numeral 12. The operation of dual-mode communications processor 10 is managed by a controller 15, such as a microprocessor. Dual-mode communications processor 10 includes dual-mode voiceband signal processor 20 operative to exchange digitized speech samples with a codec (not shown) at an exemplary rate of 8 kilosamples/second (ksps) through dual-mode interface buffer 24. The codec is connected to the microphone and speaker of a portable communications device, in which is incorporated the dual-mode communications processor of the invention.

Dual-mode voiceband signal processor 20 may be characterized as functioning in digital modulation and FM modes. Controller 15 is disposed to configure dual-mode voiceband signal processor 20 for operation in digital modulation and FM modes.

In the digital modulation mode, dual-mode voiceband signal processor 20 decodes data transferred from digital modulation modem 40 through digital modem interface 44 and provides this decoded data to the codec through dual-mode interface buffer 24. Also in the digital modulation mode, dual-mode voiceband signal processor 20 encodes data transferred from the codec through dual-mode interface buffer 24 and provides the encoded data to digital modulation modem 40 through digital modem interface 44. In this mode, the encoding and decoding operations are performed in accordance with the variable rate CELP algorithm detailed in copending U.S. patent application Ser. No. 08/004,484. In an exemplary embodiment, digital modulation modem 40 comprises a spread spectrum modulation and demodulation network operative in the manner described in U.S. Pat. No. 5,103,459, entitled SYSTEM AND METHOD FOR GENERATING SIGNAL WAVEFORMS IN A CDMA CELLULAR TELEPHONE SYSTEM, assigned to the assignee of the present invention, the disclosure thereof incorporated by reference.

In the FM mode, data is processed by FM modem 50, which in the exemplary embodiment comprises a narrowband modulation and demodulation network of the type described in the aforementioned copending U.S. patent application Ser. No. 08/373,122.

In the FM mode, dual-mode voiceband signal processor 20 processes data transferred from FM modem 50 through FM modem interface 54 and provides this processed data to the codec (not shown) through dual-mode interface buffer 24. Also in the FM mode, dual-mode voiceband signal processor 20 processes data transferred from the codec through dual-mode interface buffer 24 and provides the processed data to FM modem 50 through FM modem interface 54. In this mode, the signal processing operations are performed in accordance with FM cellular telephone standards.

During both modes of operation, dual-mode interface buffer 24 transfers pulse code modulation (PCM) speech sample data to and from a codec (not shown). In the exemplary embodiment the PCM samples are in the form of m-law or A-law companded data or linear sample data. Digital modulation modem 40 and FM modem 50 will typically be coupled to the baseband processing circuitry (not shown) associated with an RF transceiver.

Dual-mode communications processor 10 may also include various ancillary interface circuits, such as RF interface 60 and general purpose interface 70, both coupled to controller 15. RF interface 60 is in communication with the RF transceiver and primarily functions to send and receive power amplifier (PA) control and automatic gain control (AGC) information. General purpose interface 70 may be connected to multiple external devices, such as a keypad or a ringer. Dual-mode interface buffer 24 provides timing information to timing generator 110 (FIG. 2), based on the timing of samples received from the codec. As is described herein, dual-mode interface buffer 24 is designed to be used in both the FM and digital modulation modes.

Figure 2:
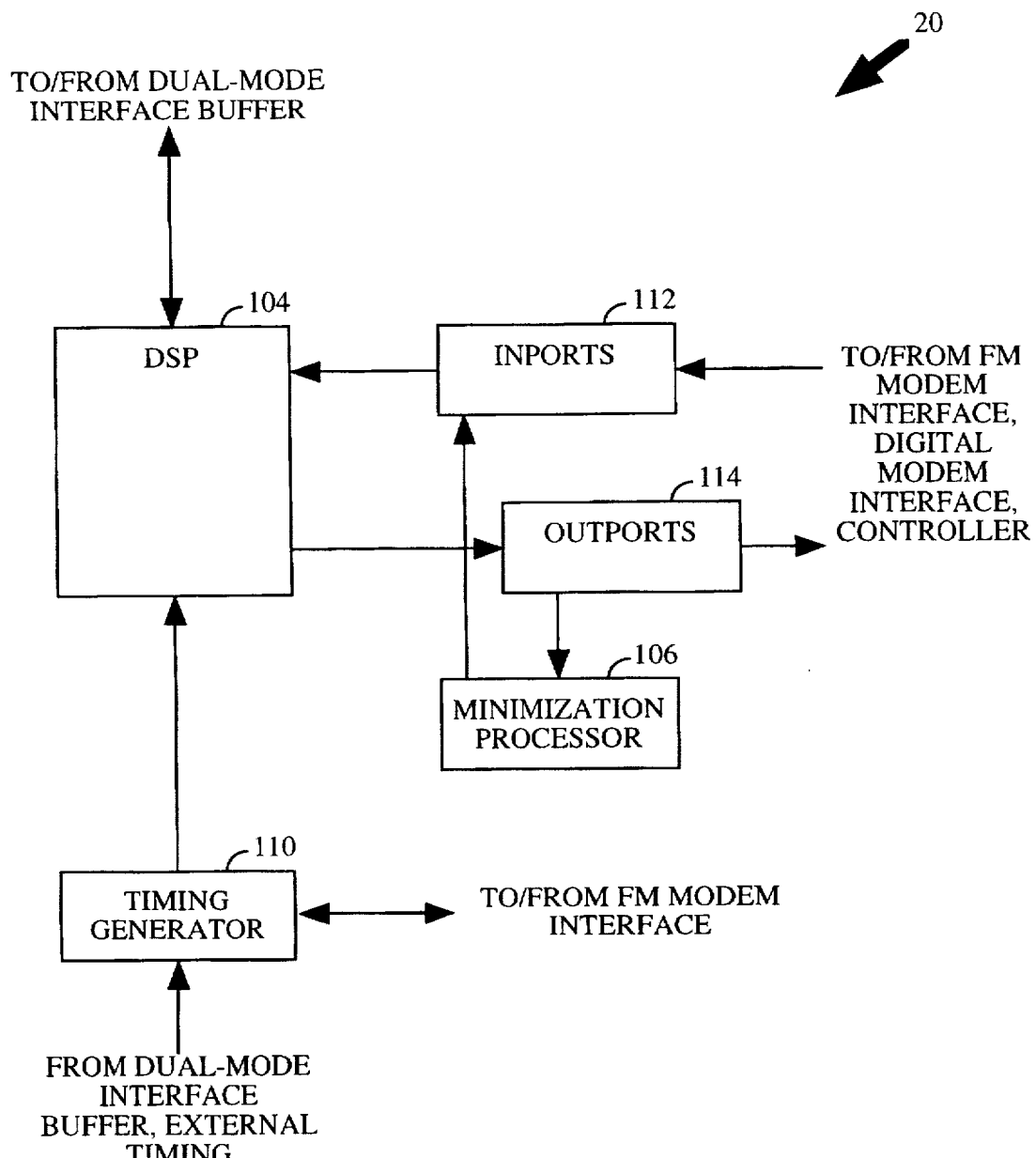
FIG. 2 is a block diagram of the architecture of a dual-mode voiceband signal processor included within the dual-mode communications processor of FIG. 1.

Turning now to FIG. 2, dual-mode interface buffer 24 provides, to DSP 104, the PCM speech sample data received from the codec (not shown). This PCM speech sample data may be used for either CELP encoding or for FM TX processing. Dual-mode interface buffer 24 also provides, to the codec, the PCM speech sample data received from DSP 104 after CELP decoding or after FM RX processing. The PCM data is transferred between DSP 104 and dual-mode interface buffer 24 via direct memory access (DMA).

During operation in the digital modulation mode, encoded speech data is routed through inports 112 and outports 114 to and from digital modem interface 44. During FM mode digitized data is routed through inports 112 and outports 114 to and from FM modem interface 54. This architecture advantageously enables DSP 104 and the other components of dual-mode voiceband signal processor 20 to be used for different purposes during the digital modulation and FM modes of operation.

Overview of the Digital Modulation Mode of Operation

In the digital modulation mode, DSP 104 provides data and control information to minimization processor 106 through outports 114. Minimization processor 106 aids in computationally intensive portions of the vocoding algorithm executed by dual-mode voiceband signal processor 20 during digital modulation mode operation. Minimization processor 106 provides results of minimization procedures to DSP 104 via inports 112. DSP 104 receives timing information from timing generator 110, which provides required timing information to all functional elements of dual-mode communications processor 10. Outports 114 receive data from DSP 104, and provide the received data to controller 15, digital modem interface 44, FM modem interface 54 and minimization processor 106. Inports 112 receive data from controller 15, digital modem interface 44, FM modem interface 54 and minimization processor 106, and provide the received data to DSP 104. Inports 112 and outports 114 may also receive and provide other types of data from and to external devices (not shown).

DSP 104 is comprised of a triple-partitioned random access memory (RAM), a read only memory (ROM) for coefficient storage, a ROM for instruction storage, and an efficient arithmetic logic unit (ALU). In the preferred embodiment DSP 104 is structured in the manner described in copending U.S. patent application Ser. No. 08/197,417, which has been previously incorporated herein by reference. Nonetheless, a brief description of the triple-partitioned RAM and ALU of DSP 104 is set forth below to facilitate understanding of the remainder of this application.

Figure 3A:
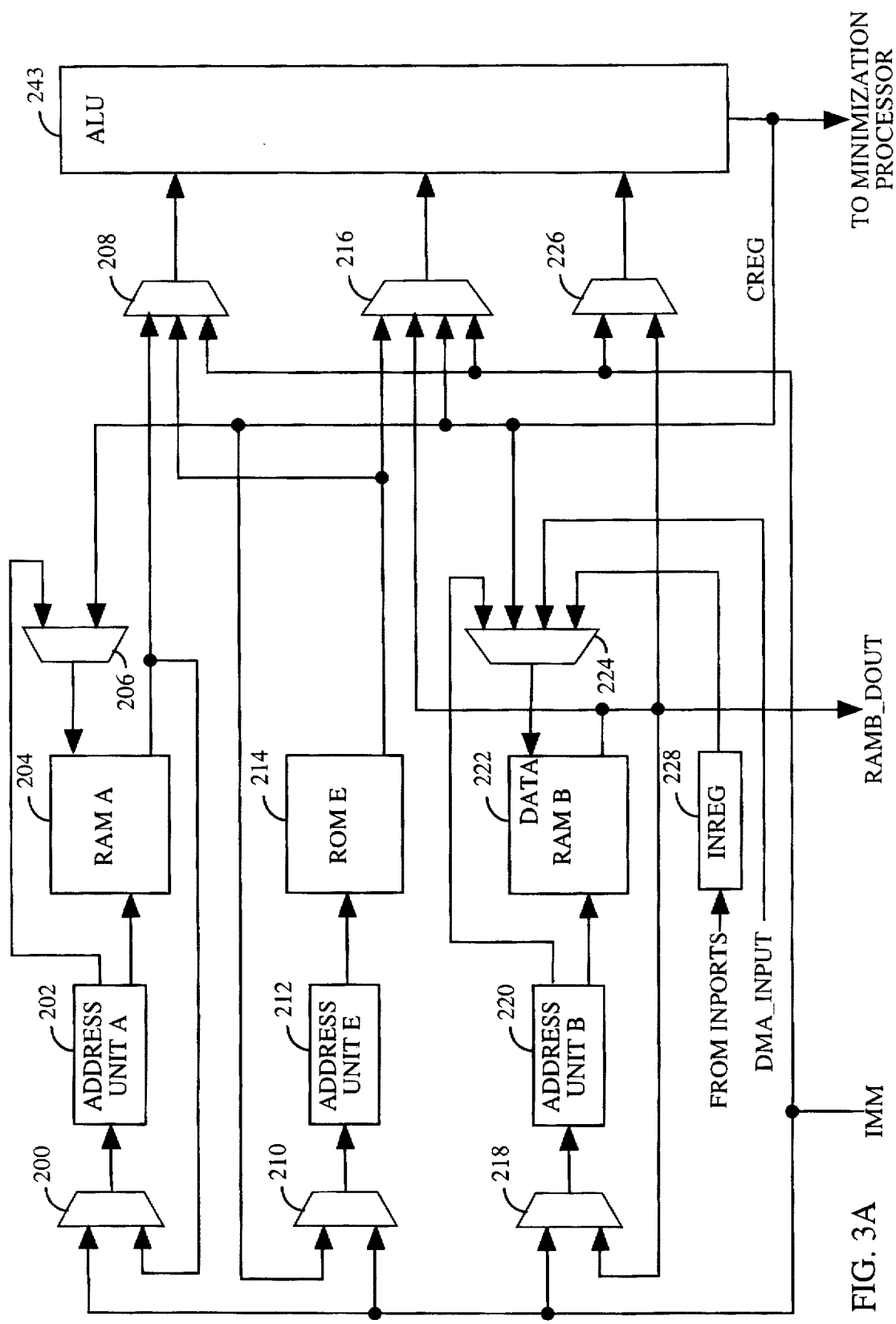
FIGS. 3A–3C illustratively represent the structure of a DSP included within the dual-mode voiceband signal processor of FIG. 2.
Figure 3B:
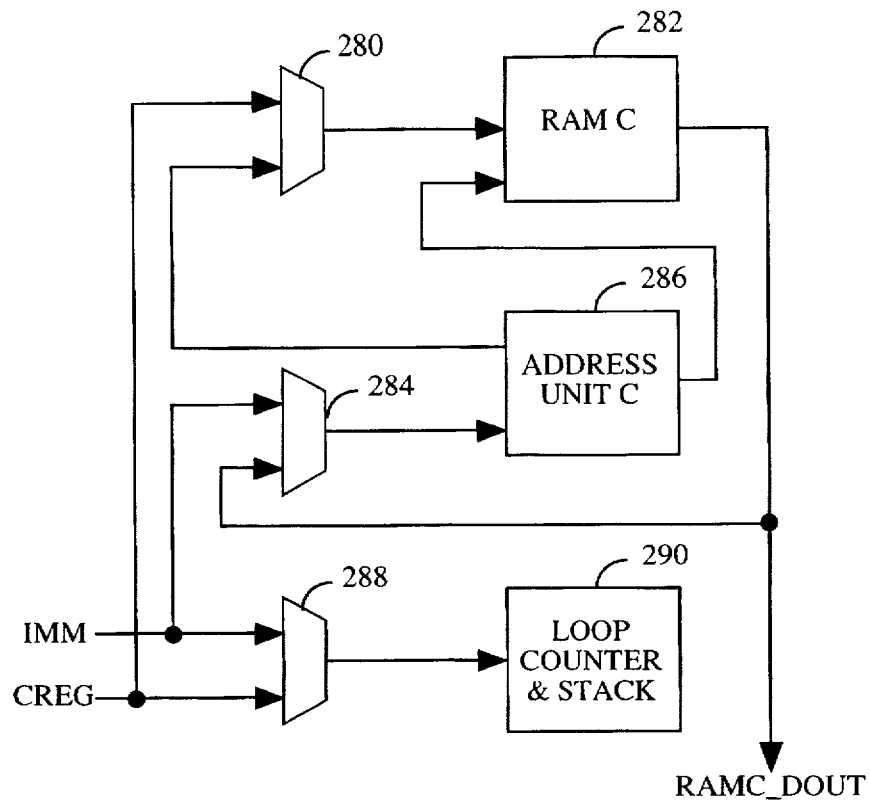
Figure 3C:
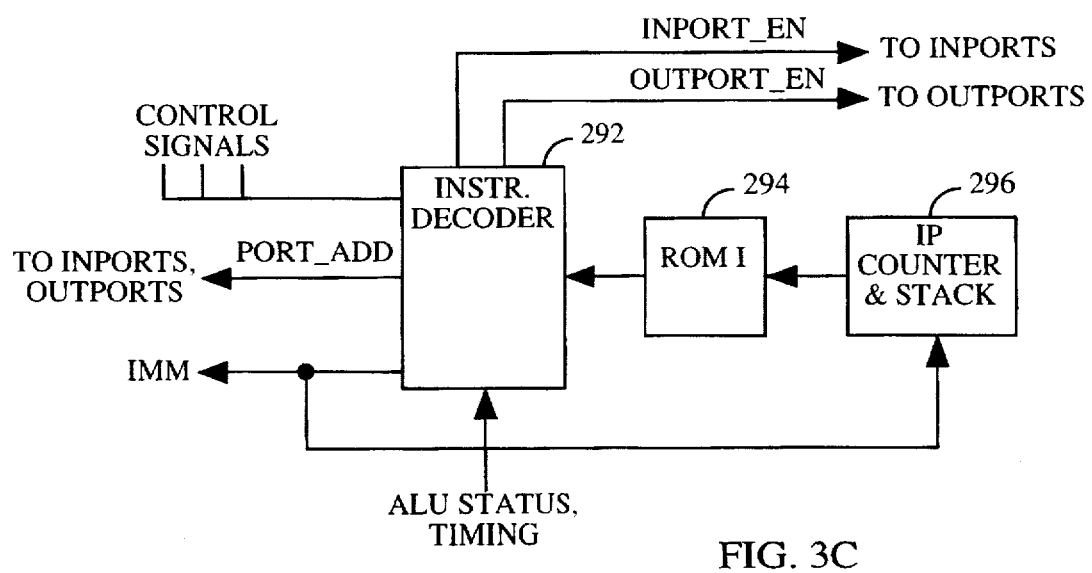

Turning now to FIGS. 3A–3C, DSP 104 is designed around the triple-partitioned RAM (RAM A 204, RAM B 222 and RAM C 282), a dedicated constant ROM (ROM E 214), and ALU 243. The triple-partitioned RAM provides more efficient ALU utilization and increased RAM bandwidth over what can be achieved with a single RAM. ROM E 214 provides 16-bit constants. The RAM partitions RAM A 204, RAM B 222 and RAM C 282 and ROM E 214, provide data to ALU 243. RAM C 282 accepts and provides 32-bit data from and to ALU 243 while RAM A 204 and RAM B 222 accept and provide 16-bit data, making computations with 16-bit operands and storage of 32-bit results highly efficient.

Each partition has a dedicated address generation unit. RAM A 204 has address unit A 202, RAM B 222 has address unit B 220, RAM C 282 has address unit C 286, and ROM E 214 has address unit E 212. Each of the address units is comprised of registers, multiplexers and adder/subtractor elements (not shown). In one clock cycle DSP 104 may perform three memory operations, three address updates, an arithmetic operation (e.g. a multiply-accumulate-normalize), and a data move to minimization processor 106.

An instruction ROM, ROM I 294 stores the instructions which control the execution sequence of DSP 104. The sequence of instructions stored in ROM I 294 describe the processing functions to be performed by DSP 104. Instruction ROM, ROM I 294 has a dedicated address generation unit, and a dedicated stack 296. The OUTPORT_EN and PORT_ADD signals are provided by instruction decoder 292 to outports 114 and inports 112. The PORT_ADD signal provides an address to outports 114 and inports 112. Outports 114 will accept data from CREG when the PORT_ADD value specifies data for outports 114 and OUTPORT_EN indicates a valid PORT_ADD value. Inports 114 will provide data to inreg 228, when the PORT_ADD value specifies data from inports 114 and INPORT_EN indicates a valid PORT_ADD value.

The RAM address generation units, address unit A 202, address unit B 220 and address unit C 286, provide address and data for corresponding RAM operations. Data may be moved from register file elements to other register file elements within the same address unit, or to the respective RAM. In the exemplary embodiment, address unit A 202 provides data through multiplexer 206 to RAM A 204, address unit B 220 provides data through multiplexer 224 to RAM B 222 and address unit C 286 provides data through multiplexer 280 to RAM C 282.

Register file elements accept immediate data (IMM), data from other register file elements within the same address unit, or data from RAM. In the exemplary embodiment, RAM A 204 provides data through multiplexer 200 to address unit A 202, RAM B 222 provides data through multiplexer 218 to address unit B 220, and RAM C 282 provides data through multiplexer 284 to address unit C 286. Each address unit provides for automatic post-increment and post-decrement using an internally provided adder/subtractor (not shown). In the exemplary embodiment, address unit B 220 provides automatic modulo addressing and two dedicated register file elements (not shown) used as pointers for DMA to/from dual-mode interface buffer 24.

ALU 243 performs multiply, add, subtract, multiply-accumulate, multiply-add, multiply-subtract, round, increment, clear, negate, and logical AND, OR, and INVERT operations. Inputs to the ALU multiplier are gated, thereby reducing power consumption by insuring that inputs change only when a multiply is performed. ALU 243 provides two 36-bit accumulators for efficiency, and two barrel shifters for normalization.

The instruction sequence is fetch, decode, execute. An address value is provided by IP counter and stack 296 to ROM I 294, which in response provides an instruction to instruction decoder 292. Instruction decoder 292 in response to this input instruction, decodes the instruction and provides control signals to the appropriate elements within DSP 104 for execution of the instruction.

Figure 4:
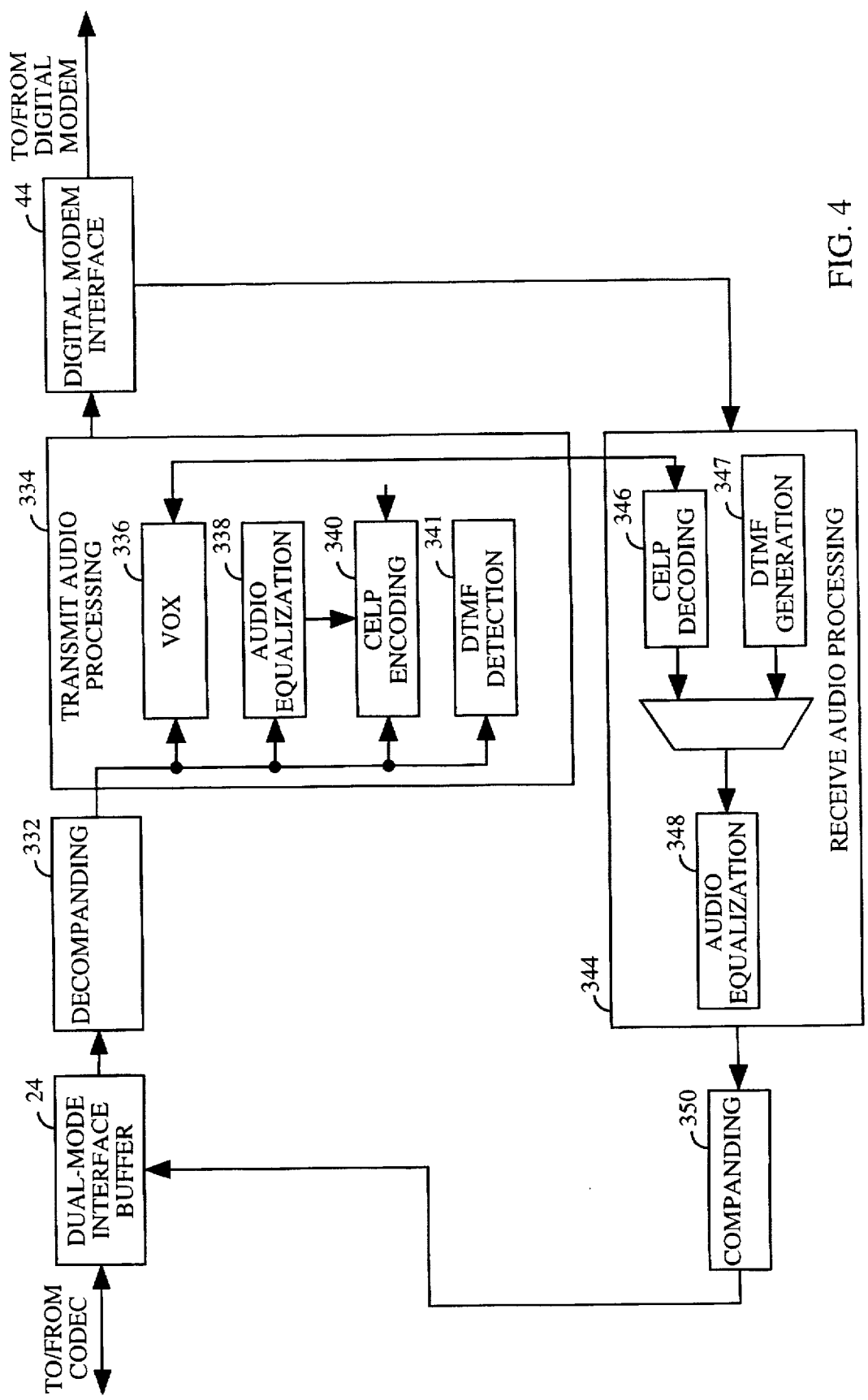
FIG. 4 illustratively represents the functions performed in the dual-mode voiceband signal processor during the digital modulation mode of operation.

FIG. 4 illustratively represents the functions performed in dual-mode voiceband signal processor 20 during digital modulation mode operation. Referring to FIG. 4, the samples to be encoded are provided to dual-mode voiceband signal processor 20 through dual-mode interface buffer 24 from a codec (not shown). These samples are then provided to decompanding element 332 which converts the m-law or A-law samples to linear samples. Samples provided to decompanding element 332 in linear format are passed through decompanding element 332 without change. Linear samples are provided to transmit audio processing element 334 which functionally comprises voice operated switch (VOX) 336, audio equalization element 338, variable rate CELP encoding element 340, and dual tone multi-frequency (DTMF) detection element 341. Transmit audio processing element 334 then provides the encoded speech packet data to digital modem interface 44, which in turn provides the encoded speech packet data to digital modulation modem 40. Encoded speech packets are provided by digital modem 40 through digital modem interface 44 to receive audio processing element 344 where they are decoded into speech samples. Receive audio processing element 344 functionally comprises variable rate CELP decoding element 346, audio equalization element 348, DTMF generation element 347, and audio selection element 345. Decoded samples generated by CELP decoding element 346 are provided to audio selection element 345. When DTMF generation is being performed, DTMF samples are provided by DTMF generation element 347 to audio selection element 345. Audio selection element 345 selects between the DTMF data samples and the CELP decoded data samples and provides these samples to companding element 350, the selection of samples being controlled by controller 15. Companding element 350 then converts the linear samples to m-law or A-law format or passes the linear samples without change to dual-mode interface buffer 24, the selection of format being controlled by controller 15. Dual-mode voiceband signal processor 20 provides the decoded samples or DTMF samples through dual-mode interface buffer 24 to a codec (not shown).

The decoding operation, shown by blocks 344 and 350 in FIG. 4, is performed in DSP 104. Dual-mode voiceband signal processor 20 receives encoded speech packets from digital modulation modem 40 through digital modem interface 44. DSP 104 decodes the speech packet, producing synthesized speech samples which are supplied to a codec (not shown) through dual-mode interface buffer 24. In DSP 104, the received packet is unpacked to obtain the data needed to synthesize speech samples. The data includes the LSP frequencies, and the pitch and codebook parameters for the corresponding subframes for the prescribed data rate. Further details on the manner in which DSP 104 synthesizes speech samples from the encoded speech packets are provided in copending U.S. patent application Ser. No. 08/197, 417.

Overview of FM Mode Operation

Turning again to FIG. 1. In this mode the digitized FM data processed by dual-mode voiceband signal processor 20 is routed through inports 112 and outports 114 to and from FM modem interface 54. In response to a predefined transition in MODE SELECT signal 28, DSP 104 changes from operation in the digital modulation mode to operation in the FM mode. At this juncture, DSP 104 ceases the transfer of CELP-encoded speech packets between digital modulation modem 40 and initiates the transfer of digitized FM data between FM modem 50. Although during normal operation dual-mode voiceband signal processor 20 will be operative in exclusively either the FM mode or the digital modulation mode, the present invention also contemplates various hybrid modes in which processing cycles are allocated to both modes. One such hybrid mode involves the decoding or "playing" of a stored CELP-encoded message during communication in FM mode. Similarly, in another hybrid mode the speech from one or both parties involved in two-way FM mode communication is CELP-encoded through vocoder operation in the digital modulation mode. In these and other such hybrid modes, dual-mode voiceband signal processor 20 rapidly switches between FM mode and digital modulation mode (i.e., CELP encoding and decoding). This "jumping" between modes is transparent to the parties involved in the communication. A detailed description of operation in various hybrid modes is given below in the section entitled Hybrid FM Mode Processing.

Transmit (TX) FM Processing

Figure 5A:
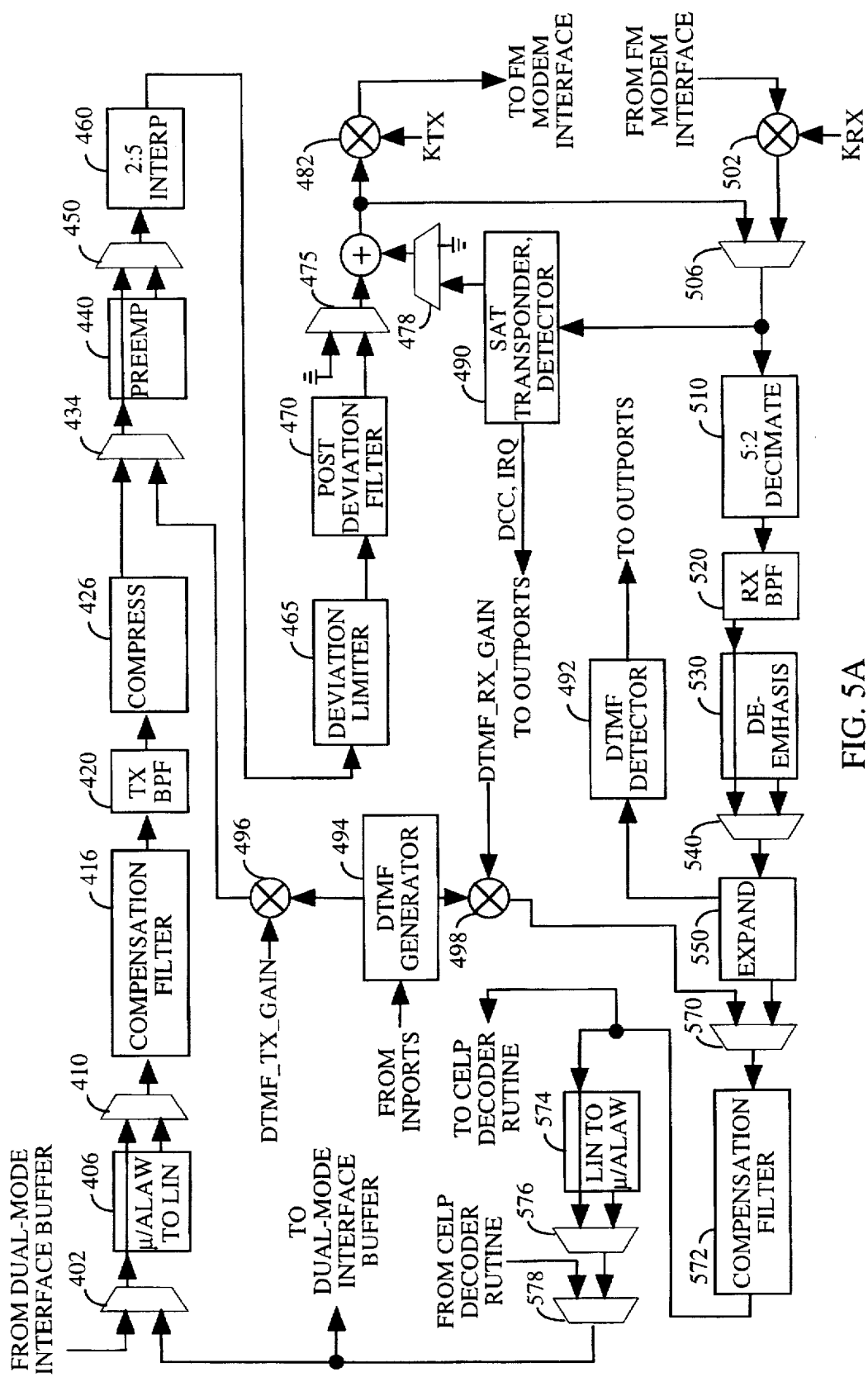
FIG. 5A illustratively represents the functions performed in the dual-mode voiceband signal processor during the FM mode of operation.

Attention is now directed to the block diagram of FIG. 5A, which illustratively represents the functions performed in dual-mode voiceband signal processor 20 during FM mode operation. During transmit operation in the FM mode, dual-mode voiceband signal processor 20 (FIG. 1) receives digitized speech samples from a codec (not shown) through dual-mode interface buffer 24 at an exemplary rate of 8 ksps. These codec samples are provided to multiplexer element 402 and passed to decompanding element 406. Decompanding element 406 converts the m-law format or A-law format samples to linear samples. Linear samples from decompanding element 406 and multiplexer 402 are provided to multiplexer element 410. Multiplexer element 410 selects the sample stream from multiplexer element 402 when the samples from the codec are in a linear format and selects the samples from decompanding element 406 otherwise. In the exemplary embodiment decompanding element 406 identically corresponds to the decompanding element employed during digital modulation mode operation. This architecture advantageously enables DSP 104 to be used for both digital modulation and FM modes of operation.

Multiplexer 410 provides the linear samples to compensation filter 416, which may be realized as a fourteen-tap finite impulse response (FIR) filter. Compensation filter 416 is used to equalize the microphone frequency response and/or to provide audio pre-emphasis. The compensation filter coefficients may be supplied by controller 15 (FIG. 1) through a port (not shown) connected to inports 112.

Compensation filter 416 provides compensated sample data to TX bandpass filter (BPF) 420, within which the sample data is bandlimited to the nominal audio bandwidth of 300 Hz to 3 kHz. In the exemplary embodiment TX BPF 420 is implemented with a third-order Butterworth bandpass transfer characteristic, having a 3 decibel (dB) bandwidth of 300 Hz to 3.3 kHz. Below 300 Hz the filter 420 will preferably exhibit a 24 dB/octave roll-off, which is commensurate with existing commercial designs.

Figure 5B:
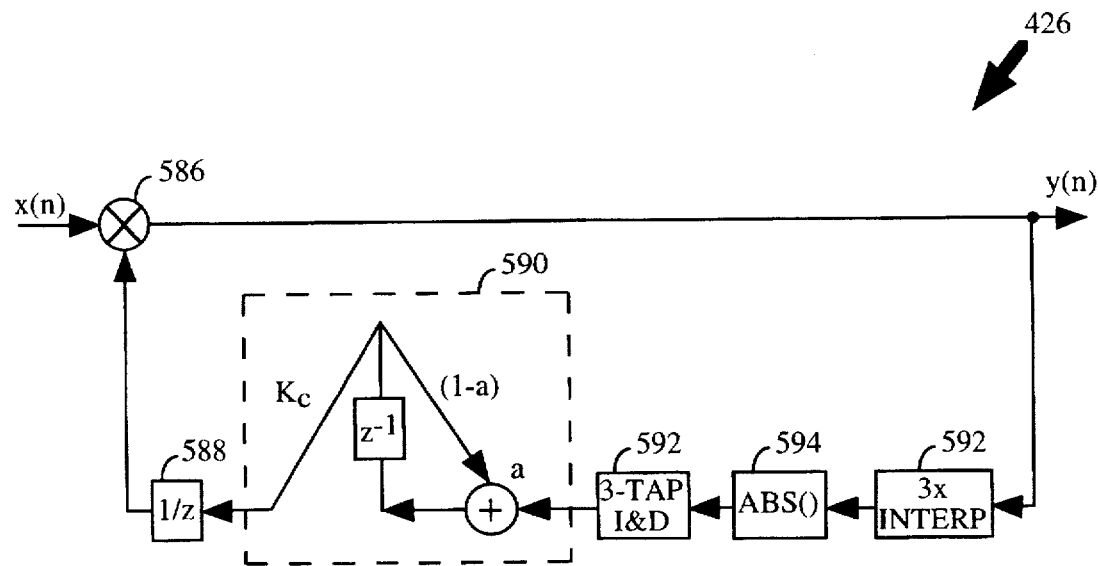
FIG. 5B is a block diagram of an exemplary implementation of the compressor of FIG. 5A.

Compressor 426 is detailed in FIG. 5B. Turning now to FIG. 5B, a block diagram is provided of an exemplary digital implementation of compressor 426. Compressor 426 receives input from TX BPF 420. This input is provided to multiplier element 586, where it is multiplied by the output of loop divider element 588. The product of the multiplication is then provided to DTMF multiplexer element 434, and is also provided to (1:3) interpolator element 596. The output of (1:3) interpolator element 596 is provided to absolute value function element 594. The output of the absolute value function element 594 is provided to integrate and dump filter element 592, which is coupled to loop filter element 590. The filtered output of loop filter element 590 is furnished to loop divider element 588, with the output of loop divider element 588 being provided to multiplier element 586 as previously described. Exemplary attack and decay times for loop filter 590 of 3 ms and 13.5 ms, respectively, are achieved by selecting a loop filter time constant of 20 ms. It follows that for the exemplary loop time constant of 20 ms, and a sample rate of 8 ksps, the value, a, (FIG. 5B) is approximately 0.00625. The zero dB reference for compressor 426 is set by the scale factor $K_c$, where $K_c$ is equal to 3.30567 for a normalized zero dB reference.

Turning again to FIG. 5A. During normal operation DTMF multiplexer element 434 selects the output of compressor 426 to be provided to a preemphasis filter 440. When DTMF tones are to be generated on the TX FM path by DTMF generator 494, DTMF multiplexer element 426 selects the output of DTMF TX gain element 496. DTMF TX gain element 496 receives input from DTMF generator 494. The DTMF volume is set by DTMF_TX_GAIN under control of controller 15.

Preemphasis filter 440 provides gain over the higher frequencies of the FM audio band in order to compensate for the enhanced high-frequency noise levels produced during demodulation in FM modem 50. Preemphasis filter 440 is characterized by a response of +6 dB/octave over the FM audio band (i.e., 300 Hz to 3 kHz), with 0 dB gain occurring at approximately 1 kHz. In the preferred embodiment preemphasis filter 440 is implemented as a first order infinite impulse response (IIR) high-pass filter (HPF) having the following z-transform:

$$H(z)=k(1+b_1z^{-1})/(1+a_1z^{-1})$$

where, in order to achieve the desired +6 dB/octave response, k=1.53386, $b_1$=1, and $a_1$=0.23. Preemphasis filter 440 may be effectively disabled by instructing preemphasis multiplexer element 450 to select the output of DTMF multiplexer element 434. The output of preemphasis multiplexer element 450 is provided to (2:5) interpolation filter 460.

During FM mode operation, a SAT signal is required to be broadcast along with the TX FM signal. Since the SAT signal frequency is approximately 6 kHz, in order to satisfy the Nyquist criterion it is necessary to increase the sample rate of the digitized data from 8 ksps to at least 12 ksps. In a preferred embodiment (2:5) interpolation filter 460 is provided for increasing the sample rate from 8 ksps to 20 ksps, which results in an oversampling ratio of (1.67:1) with respect to the approximately 6 kHz SAT signal.

The non-integer interpolation ratio of (2:5) is efficiently implemented using a FIR "M/N" interpolation scheme. This is achieved by first upsampling the incident 8 ksps stream of digitized data to 40 ksps (5×interpolation) using a zero padding technique. The upsampled data will then typically be passed through a low-pass filter (LPF) before being decimated to 20 ksps. The LPF will preferably be realized as an FIR LPF, in which ⅕ of the taps are zero due to the 5× zero padding and interpolation. Since a computation need be performed for only one of every five taps, for an N-tap FIR filter the number of multiply/accumulate operations is approximately N/5 per output sample. In a preferred embodiment the LPF performed in interpolation filter 460 is effected using a 30-tap FIR filter having in excess of 50 dB stopband attenuation, and having approximately—0.8 dB roll-off at 3 kHz.

The output of (2:5) interpolation filter 460 is provided to deviation limiter 465. Deviation limiter 465 is designed to limit the audio modulation to a maximum instantaneous frequency deviation of 12 kHz, and has the following memoryless transfer function:

$$\begin{aligned} y(n) &= 1 & \text{for} & \quad 1 < x(n) \\ &= x(n) & \text{for} & \quad -1 < x(n) < 1 \\ &= -1 & \text{for} & \quad x(n) < -1 \end{aligned}$$

where the threshold parameter 1 is determinative of the maximum frequency deviation. In the exemplary embodiment the value of 1 is selected to provide a nominal frequency deviation of approximately 7.7 kHz, which results in a maximum frequency deviation of less than 12 kHz.

The output of deviation limiter 465 is provided to post-deviation filter 470, which provides at least 35 dB of attenuation at the SAT frequency 6 kHz. In the exemplary embodiment post-deviation filter 470 is implemented as a sixth order Butterworth LPF, having a 3 dB frequency of 3.15 kHz and unity gain (0 dB) at nominal 3 kHz bandwidth. The TX FM signal may be muted through the application of the appropriate control signal to TX FM muting multiplexer element 475. The output of TX FM muting multiplexer element 475 is summed within adder element 480 with the output of SAT transpond multiplexer element 478. SAT transpond multiplexer element 478 selects the output of SAT transponder and detector 490 when SAT transpond is enabled and selects "zero" when SAT transpond is disabled. The SAT transpond is enabled and disabled by controller 15 (FIG. 1). The SAT transpond signal recovered by SAT transponder and detector 490 during receive (RX) FM processing is provided to one input of SAT transpond multiplexer element 478. The output of adder element 480 is provided to TX FM multiplier element 482, which multiplies the TX FM signal by the constant KTX furnished by controller 15. The processed and scaled TX FM signal is provided by DSP 104 to FM modem 50 through outports 114 and FM modem interface 54 at an exemplary average TX FM sample rate of 20 ksps.

RX FM Processing

Again referring to FIG. 5A, during RX FM processing the DSP 104 receives the RX FM signal from FM modem 50 through FM modem interface 54 and inports 112. Again, the RX FM signal is so received at the exemplary average RX FM sample rate of 20 ksps. During RX processing in the FM mode, the RX FM samples are initially provided to RX FM multiplier element 502. RX FM multiplier element 502 multiplies the RX FM signal by the constant $K_{RX}$ furnished by controller 15 (FIG. 1). This multiplication is performed in order to compensate for an exemplary gain of ¾ typically inherent in decimation filter 510. Multiplexer element 506 selects between the transmit FM signal (loopback) and the receive FM signal (normal operation).

The output from multiplexer element 506 is provided to (5:2) decimation filter 510 and to SAT transponder and detector 490. The (5:2) decimation filter 510 functions to reduce the sample rate from 20 ksps to a computationally efficient processing rate of 8 ksps. This may be achieved using a FIR M/N type decimation scheme designed to perform the desired (5:2) sample rate decimation. In particular, the incident 20 ksps signal is interpolated to 40 ksps (2× interpolation), is low-pass filtered, and is then decimated from 40 ksps to 8 ksps (5× decimation). The filtering operation may be carried out using a 50-tap FIR filter having approximately 50 dB of stopband attenuation, and roll-off at 3 kHz of approximately −0.7 dB. The 8 ksps data from (5:2) decimation filter 510 is provided to RX BPF 520. The output of RX BPF 520 is provided to de-emphasis filter 530. The composite implementation of the RX decimation, bandpass and de-emphasis filters will preferably correspond to a fifth order high-pass filter cascaded with a third order low pass filter. The desired cascaded filter transfer characteristic may be achieved by realizing RX BPF 520 as a fifth order high-pass filter cascaded with a third order low pass filter. This cascaded filter is designed to bandlimit the signal to between 300 Hz and 3 kHz. In the preferred embodiment de-emphasis filter 530 is implemented as a single pole, low-pass IIR filter having a passband response of −6 dB/octave between 300 Hz and 3 kHz. Similar to that of pre-emphasis filter 440, the unity gain (0 dB) frequency of de-emphasis filter 530 is selected to be 1 kHz. De-emphasis filter 530 can be bypassed by instructing de-emphasis multiplexer element 540 to select the output of RX BPF 520. The output of de-emphasis multiplexer element 540 is provided to expander 550. The expander 550 is described in detail below with reference to FIG. 5C.

Figure 5C:
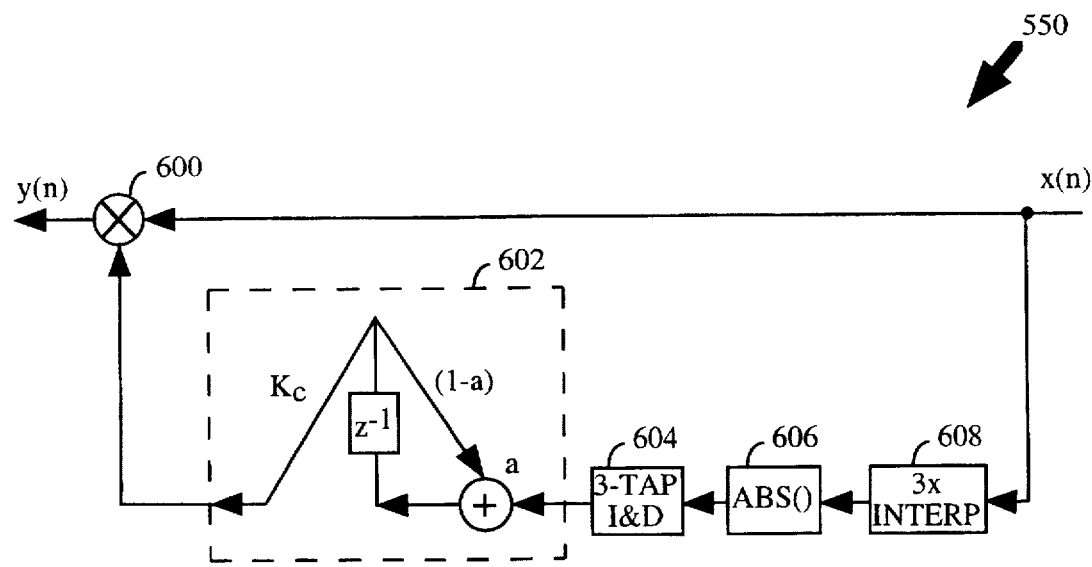
FIG. 5C is a block diagram of an exemplary implementation of the expander of FIG. 5A.

Turning now to FIG. 5C, a block diagram is provided of an exemplary implementation of expander 550. Expander 550 receives input from de-emphasis multiplexer element 540 (FIG. 5A). This input is provided to multiplier element 600, where it is multiplied by the output of loop filter element 602 and the resultant product provided to DTMF multiplexer element 570. The input to expander 550 is also provided to (1:3) interpolator element 608, which provides an interpolated output to absolute value function element 606. The output of absolute value function element 606 is provided to integrate and dump filter element 604, which is coupled to the input of loop filter element 602. The output of loop filter element 602 is provided to multiplier element 600 as described previously. Exemplary attack and decay times for loop filter 602 are 3 ms and 13.5 ms, respectively, and are achieved by selecting a loop filter time constant of 20 ms. It follows that for the exemplary loop time constant of 20 ms, and sample rate of 8 ksps, the value, a (FIG. 5B) is approximately 0.00625. The zero dB reference for expander 550 is set by the scale factor $K_e$, where $K_e$ is equal to 3.30567 for a zero dB reference.

Again referring to FIG. 5A, the output of expander 550 is provided to compensation multiplexer element 572 and to DTMF detector 492. During normal operation DTMF multiplexer element 570 selects the output of expander 550 to be provided to compensation filter 572. When DTMF tones are to be generated on the RX FM path, DTMF multiplexer element 570 selects the output of RX DTMF multiplier element 498. RX DTMF multiplier element 498 is provided with input from DTMF generator 494. The output of DTMF generator 494 is multiplied by the constant DTMF_RX_GAIN within RX DTMF multiplier element 498 and the product is provided to operation DTMF multiplexer element 570. In the preferred embodiment, compensation filter 572 may be used to equalize the frequency response of the speaker or for audio de-emphasis. The compensation filter may be realized as a 14-tap FIR filter with filter coefficients supplied by controller 15 (FIG. 1) through a port (not shown) connected to inports 112.

For codecs operative using PCM modulation, companding element 574 converts the linear samples to m-law or A-law samples. For codecs operative in a linear mode, multiplexer element 576 selects the samples from compensation filter 572, effectively bypassing companding element 574.

As mentioned above, operation in certain hybrid modes, involves performing the processing tasks required by both the FM mode and the digital modulation mode in parallel. This requires that DSP 104 (FIG. 1) rapidly switch context between the two processing modes. During the FM portion of operation in such hybrid modes, and also during exclusive FM mode operation, samples from multiplexer element 576 are passed by mode selection multiplexer element 578 to dual-mode interface buffer 24. During operation in the digital modulation mode, the data samples generated during the CELP decoding process are passed by mode selection multiplexer element 578 to dual-mode interface buffer 24. The output of mode selection multiplexer element 578 is also presented to multiplexer element 402 to provide RX FM loopback to the TX FM path.

Referring again to FIG. 5A, SAT transponder and detector 490 is operative during FM processing to identify the one of three possible SAT signal frequencies (i.e., 5.97 kHz, 6.0 kHz or 6.03 kHz) accompanying the received FM signal. SAT transponder and detector 490 performs a transpond function by injecting the recovered SAT signal back into the TX FM signal path through adder element 480 is previously described.

Figure 6:
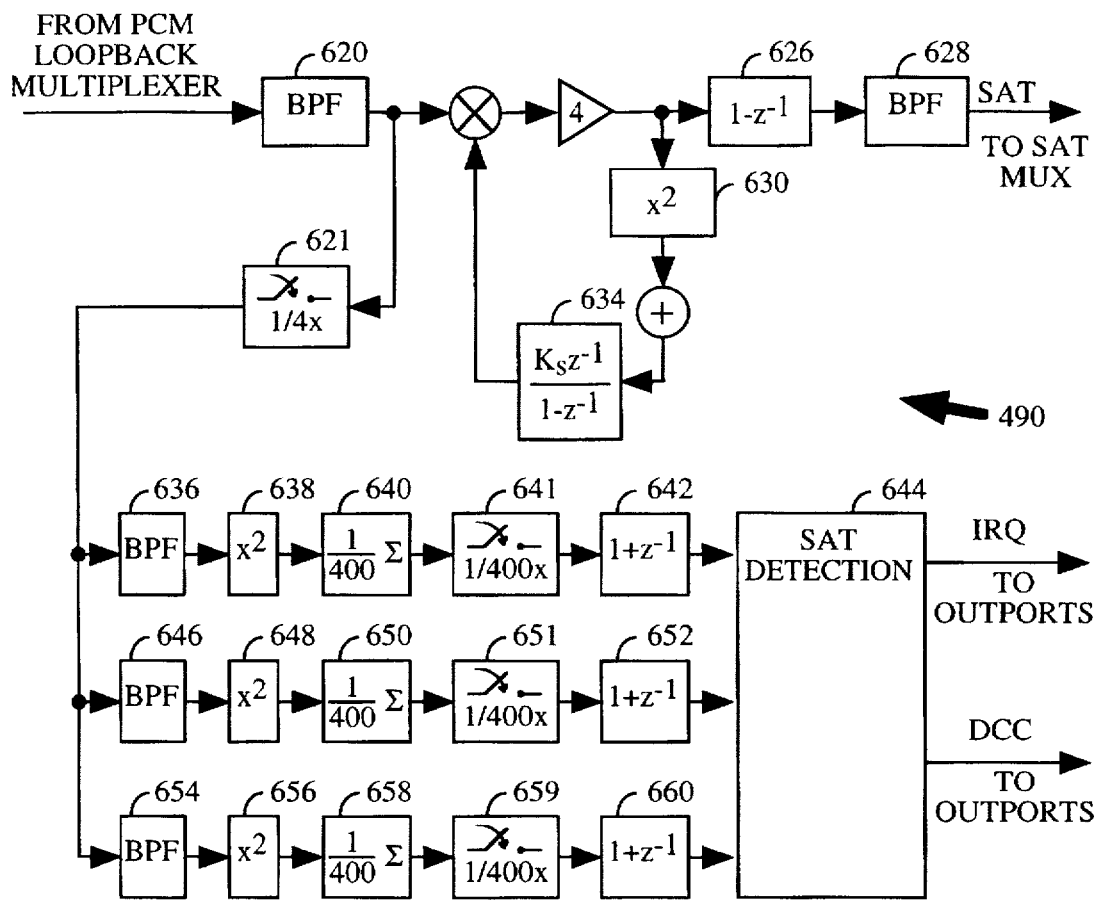
FIG. 6 is a block diagram of an exemplary digital implementation of a supervisory audio tone (SAT) transponder and SAT color code detector.

Turning now to FIG. 6, a block diagram is provided of an exemplary implementation of SAT transponder and detector 490. In performing SAT detection and transpond, only the received energy between 5.95 kHz and 6.05 kHz from PCM loopback multiplexer 506 (FIG. 5A) is passed by SAT BPF 620. The output of SAT BPF 620 is provided to multiplier element 622, which is coupled to an input of (4:1) decimation element 621. The output of (4:1) decimation element 621 is provided to BPF element 636, BPF element 646 and BPF element 654. SAT detection is performed using bandpass filters (BPF 636, BPF 646, and BFP 654), with one filter tuned to each three aliased SAT signal frequencies. An energy calculation is performed on each of the filtered signal paths using squaring elements 638, 648 and 656, together with averaging elements 640, 650 and 658. The resulting energy estimates are sampled every 80 ms by (400:1) decimation elements 641, 651 and 659. The sampled energy estimates are low-pass filtered by LPF elements 642, 652 and 660, which may be characterized by the following z-transform domain transfer function:

$$H(z)=(1+z^{-1}).$$

The outputs of LPF elements 642, 652 and 660 are provided to SAT detection element 664, which compares the absolute and relative strengths of the SAT tone energies. SAT detection element 664 then reports to controller 15 (FIG. 1), through outports 114, information relating to any received SAT tone in the form of an SAT detected color code (DCC) signal. The DCC signal is updated when the received SAT tone changes. Along with the updated DCC signal, SAT detection element 644 provides the interrupt request (IRQ) signal to controller 15 through outports 114.

Referring again to FIG. 6, SAT transponding is accomplished in the following manner. Specifically, the output of SAT BPF 620 is provided to multiplier element 622 wherein it is multiplied by the output of loop filter element 634. The resultant product is then provided to loop gain element 624, within which it is multiplied by a factor of 4. The output of loop gain element 624 is provided to loop squaring element 630 and to loop output HPF element 626. In addition, the output of loop output HPF element 626 is provided to loop output BPF element 628, which in turn is coupled to SAT multiplexing element 478 (FIG. 1). The output of loop squaring element 630 is provided to loop offset summer element 632, where it is offset by the constant $K_{SAT}$. Finally, the output of loop offset summer element 632 is provided to loop filter element 634, which furnishes a filtered signal to multiplier element 622.

An SAT automatic gain control (AGC) loop (comprised of elements 622, 624, 630, 632, and 634) is employed to regenerate any recovered SAT signal at a desired level. The AGC loop corrects for amplitude error within the received SAT signal energy. Output SAT BPF 628 has a 500 Hz bandwidth centered at 6 kHz, and is designed to provide 25 dB of rejection within the remainder of the audio band.

Referring again to FIG. 5A, DTMF generator 494 generates DTMF tones under control of controller 15 (FIG. 1). Such commands are received through inports 112. DTMF detector 492 detects DTMF tones and reports tone detection to controller 15. Such reports are supplied through outports 112. DTMF generator 494 and DTMF detector 492 are implemented using conventional methods.

Hybrid FM Mode Processing

As mentioned above, during FM mode, certain ancillary processing may be performed which would normally be done only in digital modulation mode. For example, CELP decoding is required in order to play a pre-recorded message. In order to play such a recording while in FM mode, it is required that the CELP decoding process be performed in parallel with the FM mode call. This is effected by programming dual-mode voiceband signal processor 20 to alternate between processing digitized FM data and processing data in accordance with the CELP vocoding algorithm.

Among the hybrid modes contemplated by the invention are FM/CELP-encode, FM/CELP-decode and FM/DTMF-detect. In the FM/CELP-encode mode, dual-mode voiceband signal processor 20 alternates between processing digitized FM data and performing CELP encoding on speech samples. In the FM/CELP-decode mode voiceband signal processor 20 alternates between processing digitized FM data and performing CELP decoding to produce speech samples. In the FM/DTMF-detect mode, dual-mode voiceband signal processor 20 alternates between processing digitized FM data and performing DTMF detection on voiceband samples.

For the exemplary sample rate of 20 ksps, processing of the digitized FM data typically proceeds at intervals of 1 ms (i.e., 5 digital FM samples) between episodes of CELP encoding, CELP decoding or DTMF detection. A top level flow diagram which details the transitions between processing in the available modes is given in FIG. 7.

Figure 7:
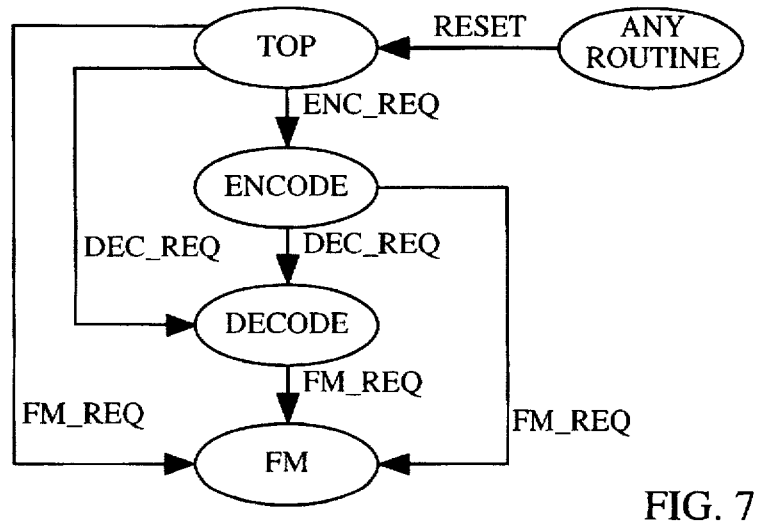
FIG. 7 is a top level flow diagram of the transitions within the voiceband signal processor control code between the TOP, ENCODER, DECODER, and FM routines.

Referring now to FIG. 7, upon reset of dual-mode voiceband signal processor 20 the voiceband signal processor control code performs initialization functions and enters the top level service routine (TOP) which responds to requests for service from the various processes. While idle in TOP, the voiceband signal processor control code regularly checks several status signals (FM_REQ, DEC_REQ, and ENC_REQ). These status signals respectively indicate whether FM processing, CELP-decoding, or CELP-encoding has been requested by timing generator 110 (FIG. 2). In the exemplary embodiment, timing generator 110 requests service for the CELP-encode and CELP-decode processes. Further testing is performed by the voiceband signal processor control code within DECODE and ENCODE in order to determine if CELP-decoding and/or CELP-encoding are respectively required. If no processing is required in a particular routine, then control generally returns to the calling routine. Due to the relative processing requirements of the FM, CELP-decode, and CELP-encode processes, the next highest processing priority is given to the FM routine, next highest priority is accorded to the DECODER routine, and lowest priority is assigned to the ENCODER routine.

A request for FM processing (FM-REQ) may be made when an FM call connection has been setup and digitized FM data needs to be processed as described in the preceding sections entitled *Transmit (TX) FM Processing* and *RX FM Processing*. Similarly, the ENC_REQ signal becomes active when sampled data is required to be CELP-encoded within dual-mode voiceband signal processor 20. The data to be encoded is provided to dual-mode voiceband signal processor 20 by a codec (not shown) through dual-mode interface buffer 24 (FIG. 1). Alternately, the data to be encoded may be provided to dual-mode voiceband signal processor 20 by RX FM compensation filter 572 (FIG. 5A). The DEC_REQ signal becomes active when a CELP-encoded packet is ready to be CELP-decoded. The data to be decoded is provided to dual-mode voiceband signal processor 20 by digital modulation modem 40, through digital modem interface 44 and inports 112.

Figure 8A:
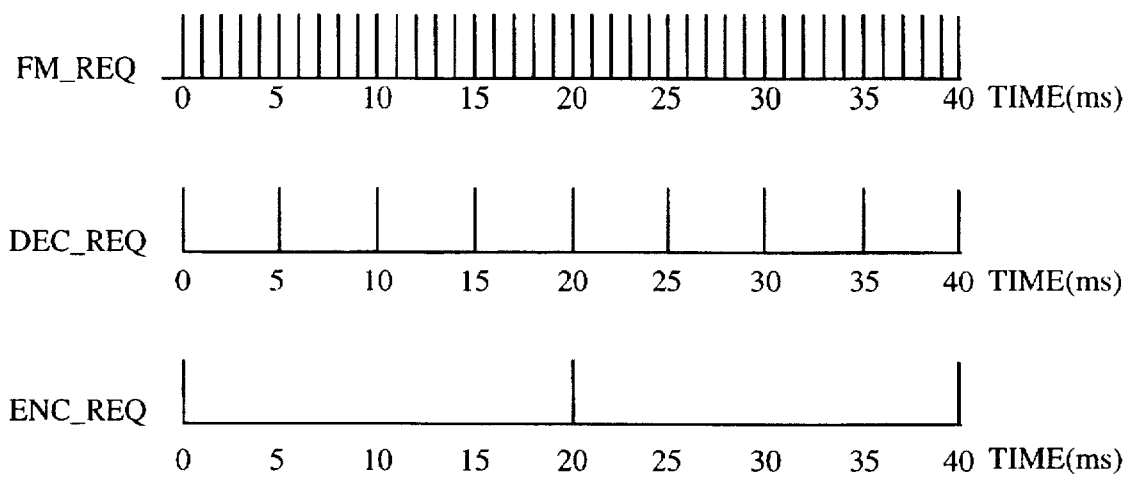
FIG. 8A is a diagram representative of the relative timing between the ENC_REQ, DEC_REQ and FM_REQ signals during a 1 ms FM mode of operation.

Referring now to FIG. 8A, a timing diagram is provided of a representative alignment of the active edges of the FM_REQ, DEC_REQ and ENC_REQ signals. These signals are polled by dual-mode voiceband signal processor 20 (FIG. 1) as directed by the voiceband signal processor control code while in the TOP routine (FIG. 7). A requirement of the system may be that each request be serviced within the period of two like-requests. This requirement ensures that the voiceband signal processor control code will not fall behind in the various processing requirements.

Figure 8B:
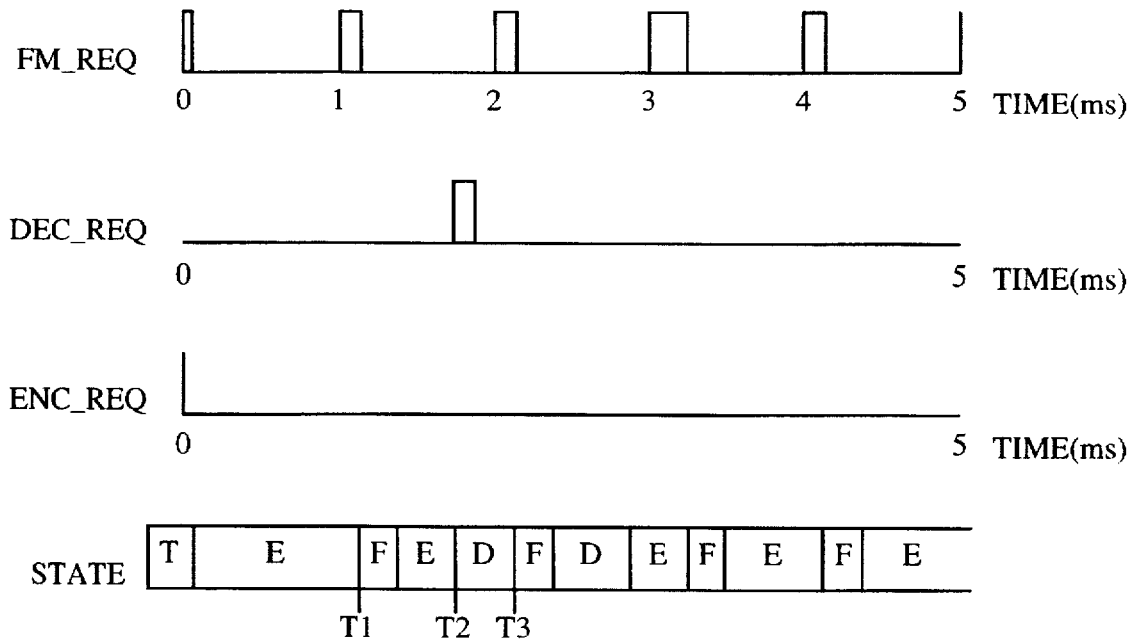
FIG. 8B is a diagram representative of the state of the voiceband signal processor control code and service request signals during a typical portion of a 20 ms frame.

FIG. 8B is a timing diagram representative of the typical state of the voiceband signal processor control code while performing a part of the CELP-encoding process. This typical state trace covers a part (5 ms) of a 20 ms CELP-encoder frame and is representative of operation in a "hybrid" mode. The control code state (STATE) is generally referenced by T, E, F, and D, referring to the respective TOP, ENCODER, DECODER, and FM routines (FIG. 7). In the exemplary embodiment the duration between polls of the FM_REQ signal is no more than 0.8 ms, the duration between polls of the DEC_REQ signal is no more than 0.8 ms, and the duration between polls of the ENC_REQ signal is no more than 3 ms.

In the exemplary embodiment the FM routine takes priority over the DECODER and ENCODER routines and the DECODER routine takes priority over the ENCODER routine as described above. This prioritization is exemplified in FIG. 8B, where it is seen that while control resides in the ENCODER routine, an FM_REQ is issued and control passes to the FM routine (time T1). Similarly, while the control code is servicing the ENCODER routine, a DEC_REQ is issued and control passes to the DECODER routine (time T2). While the control code is servicing the DECODER routine, an FM_REQ is issued and control passes to the FM routine (time T3). This context switching continues in this manner throughout processing in the ENCODER routine. When the ENCODER routine is complete, control returns to the TOP routine, which is an idle state in the exemplary embodiment. This prioritized service scheme provides the framework required for FM mode (FM only), digital modulation mode (CELP only), or hybrid FM mode (simultaneous FM and CELP processing). In the exemplary embodiment, the DEC_REQ and ENC_REQ are active even in the FM only mode, in which case the ENCODER and DECODER routines simply jump to the routine from which they were called. The scope of the invention does not require that the DEC_REQ and ENC_REQ be active at all times. It is seen in FIG. 7 that the service scheme will operate as required for FM only mode without the issuance of the ENC_REQ and DEC_REQ signals.

Exemplary Hybrid Operational Modes

The hybrid mode processing discussed in the preceding section facilitates operation of portable communication devices in various hybrid operational modes, a number of which are described below. The particular hybrid modes described herein are merely exemplar, and other hybrid modes will also be within the scope of the invention. In each such hybrid mode, ancillary CELP processing occurs during the course of an otherwise standard FM call connection. For example, the ancillary process may record or play a message. That is, an FM mode call connection is initially established, and ancillary CELP encoding or decoding then proceeds as described in one of the following paragraphs. In hybrid operational modes involving an FM mode call connection and ancillary CELP decoding, processing proceeds in "parallel" in the sense that mode select multiplexer element 578 (FIG. 5A) alternately passes FM-processed and CELP-decoded data. In this case loopback multiplexer element 402 may select the output of mode select multiplexer element 578, so as to route the CELP-decoded sample stream to the TX FM path to "play" the message to the calling party. Similarly, in these FM/CELP-decode modes, dual-mode voiceband signal processor 20 alternates between processing CELP-encoded packets received from controller 15, and performing the FM processing necessary to maintain the FM call connection. When ancillary CELP encoding proceeds in parallel with normal FM call processing, dual-mode voiceband signal processor 20 alternately provides FM data and CELP-encoded packet data to FM modem interface 54 and to controller 15, respectively. Similarly, in these FM/CELP-encode modes, dual-mode voiceband signal processor 20 alternates between processing CELP-encoding voice samples received from the RX FM path through PCM loopback multiplexer element 506, and performing the FM processing necessary to maintain the FM call connection.

In each hybrid mode discussed below, ancillary CELP processing will alternate with normal call processing at a rate sufficient to ensure that the perceived quality of the call connection is not degraded.

*Automatic Answering—Play Outgoing Message:* In this hybrid operational mode, an incoming call is automatically answered by establishing an FM mode call connection. Next, a stored CELP-encoded message is decoded by dual-mode voiceband signal processor 20, looped back to the TX FM path through multiplexer element 402 (FIG. 5A), processed as in normal TX FM mode operation by dual-mode voiceband signal processor 20, and provided to FM modem 50 through FM modem interface 54 and outports 112. The result is that the message is "played" (i.e., transmitted) to the calling party. If it is desired to allow the calling party to provide control information by push-button dialing, DTMF detection may be enabled in parallel.

*Automatic Answering—Record Incoming Message:* In this hybrid operational mode, an incoming call is automatically answered by establishing an FM mode call connection. Next, a stored CELP-encoded message is optionally decoded and played to the calling party as described above.

Next, the callers voice response (if any) to the played message is recorded by CELP-encoding and storing the resulting voice packet data. If it is desired to allow the calling party to provide control information by push-button dialing. DTMF detection may be enabled in parallel.

*Voice Record:* After an FM mode call is established the digitized speech of either or both of the calling parties is CELP-encoded and stored. If a digital modulation mode call connection has been established, the CELP-encoded data provided during normal call processing is simply stored and thereby made available for subsequent playback. In the case of an FM call connection, CELP encoding and storing of either or both of the parties' digitized speech proceeds in parallel with FM processing of the digitized speech. This hybrid mode requires FM, CELP-decode and CELP-encode be performed in parallel.

FM Modem Interface and Operation

Figure 9:
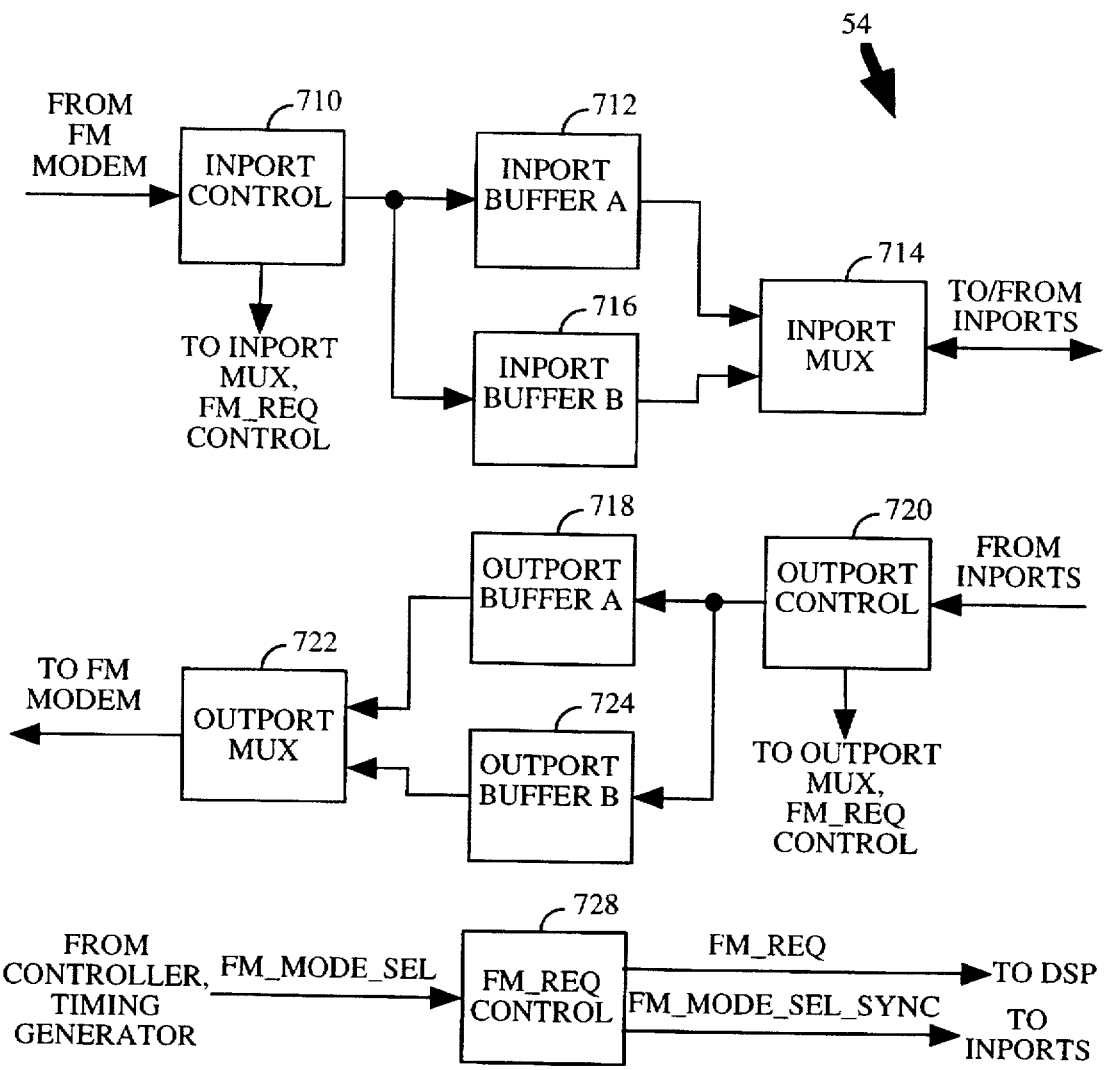
FIG. 9 illustratively depicts the architecture of an FM modem interface within the dual-mode communications processor of FIG. 1.

FIG. 9 depicts the architecture of FM modem interface 54. FM modem interface 54 includes RAM buffers comprised of inport buffer A (712), inport buffer B (716), outport buffer A (718), and outport buffer B (724). Inport buffer A (712) and inport buffer B ( 716) interface with inports 112 through, and under the control of, inport control 710. Outport buffer A( 718) and outport buffer B (724) interface with outports 114 through, and under the control of, outport control 720. Inport buffer A (712) and inport buffer B (716) accept RX FM samples processed by FM modem 50 through inport control 710. In like manner outport buffer A (718) and outport buffer B (724) provide TX FM samples to FM modem 50 through outport control 720.

In the preferred embodiment, FM modem interface 54 functions in a 1 ms processing mode during operation of the dual-mode communications processor in one of the above-described hybrid modes, and functions in a 0.25 ms processing mode during exclusively FM mode operation. In the 1 ms processing mode, FM modem interface 54 reads/writes blocks of twenty FM samples every millisecond. In the 0.25 ms processing mode, FM modem interface 54 reads/writes blocks of five samples every quarter millisecond. The dual-mode nature of the FM processing is done so as to provide a minimal processing latency mode (the 0.25 ms mode) and a nominal processing delay mode (1 ms mode). The minimum processing delay mode provides lower end-to-end voice delay. The nominal processing delay mode results in higher end-to-end voice delay, but requires less total processing operations due to the advantages of processing the FM samples in a "batch" mode. The remaining processing cycles, saved through the "batch" processing in the nominal delay mode can then be used for other processing as is described in the section above entitled *Exemplary Hybrid Operational Modes.*

FM_REQ control 726 receives timing information from timing generator 110 (FIG. 2). Based on this timing information, FM_REQ control generates the FM_REQ signal and provides this signal to inports 112. FM_REQ control 726 also obtains the FM_MODE_SEL signal from controller 15 (FIG. 1). Based on the FM_MODE_SEL signal, as well as on the states of inport control 710 and outport control 722, the FM_MODE_SEL_SYNC signal is provided to inports 112. Upon issuance of each FM_REQ signal and during subsequent service in the FM routine, the voiceband signal processor control code issues OUTPORT_ EN, INPORT_EN, and PORT_ADD signals to FM modem interface 54. Specifically, the OUTPORT_EN and PORT_ ADD signals are provided to outport control 720, which results in an FM sample being written from outport 114 to either outport buffer A (718) or to outport buffer B (724) under control of outport control 720. The buffer to which is information is currently being written is referred to as the active outport buffer, while the other outport buffer is referred to as the inactive outport buffer.

In parallel with writing to the active outport buffer, FM samples may be read from the inactive outport buffer per control of outport control 720. The samples read from the inactive outport buffer are provided to FM modem 50 via outport multiplexer 722. Similarly, the INPORT_EN and PORT_EN signals are provided to inport control 714, which results in an FM sample being read from either inport buffer A (712) or from inport buffer B (716) to inport 112 under control of inport control 710. The buffer from which information is being read from is referred to as the active inport buffer, while the other inport buffer is referred to as the inactive inport buffer. In parallel with reading from the active inport buffer, FM samples may be written to the inactive inport buffer per control of inport control 710. The samples written to the inactive inport buffer are furnished by FM modem 50.

In the 1 ms processing mode, 20 TX FM samples are transferred during each output operation from outports 114 to FM modem 50. Additionally, 20 RX FM samples are transferred from FM modem 50 to inports 112. In the 0.25 ms processing mode, outport operations are repeated so as to transfer 5 TX FM samples from outports 114 to FM modem 50 and 5 RX FM samples from FM modem 50 to inports 112.

As mentioned above, FM modem interface 54 operates in 0.25 ms mode when dual-mode voiceband signal processor 20 is engaged in exclusively FM mode operation, and may operate in the 1 ms mode during hybrid mode operation. Accordingly, FM modem interface 54 must transition between the 0.25 ms mode and the 1 ms mode when dual-mode voiceband signal processor 20 changes between exclusively FM mode and hybrid mode operation. The transition from the 0.25 ms more to the 1 ms mode is initiated when controller 15 resets the FM_MODE_SEL signal. In response, the FM_MODE_SEL_SYNC signal is reset within FM modem interface 54 coincident with generation of the second FM_REQ signal by FM modem interface 54 (following the reset of the FM_MODE_SEL signal). In the exemplary embodiment this delay is required to satisfy pipeline delays between the FM sample data and the associated control signal (FM_MODE_SEL_SYNC). The transition from the 1 ms mode to the 0.25 ms mode proceeds in a similar fashion under direction of controller 15.

Figure 10:
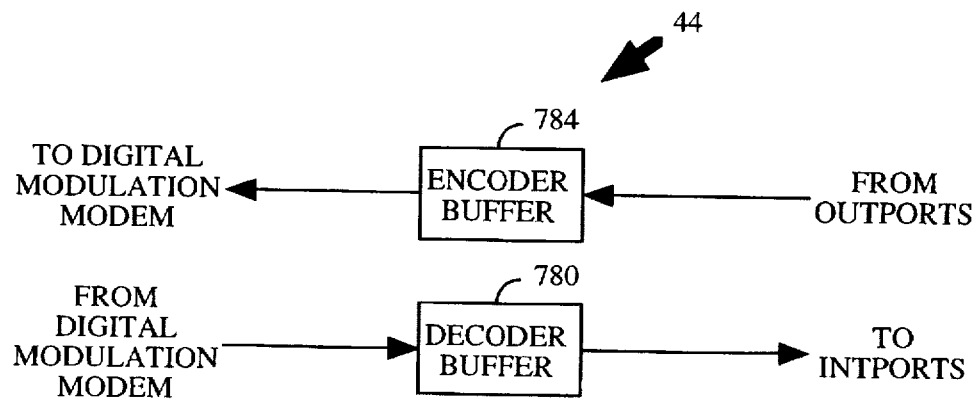
FIG. 10 is a block diagram of an exemplary implementation of the digital modulation interface within the dual-mode communications processor of FIG. 1.

Referring now to FIG. 10, a block diagram is provided of an exemplary implementation of digital modem interface 44. Digital modem interface 44 includes decoder buffer 780 and encoder buffer 784. In a preferred implementation, both decoder buffer 780 and encoder buffer 784 are realized using RAMs, a byte counter, and control logic. Each single port RAM may contain up to 128 bytes of data including a CELP-encoded speech packet. Transfer of packets from digital modulation modem 40 to decoder buffer 780, and from encoder buffer 784 to digital modulation modem 40, are effected using conventional techniques. Such conventional techniques may include, for example, DMA and equivalent processes.

Encoder buffer 784 interfaces with outports 114 under the control of control logic within encoder buffer 784. Similarly, decoder buffer 780 interfaces with inports 112 under the control of control logic within decoder buffer 780. Encoder buffer 784 accepts CELP-encoded packet bytes from outports 114 and provides these CELP-encoded packet bytes to digital modulation modem 40. Decoder buffer 780 provides CELP-encoded packet bytes to inports 112 and accepts these CELP-encoded packet bytes from digital modulation modem 40. In an exemplary implementation, digital modem interface 44 functions in a 20 ms processing mode during operation of dual-mode communications processor 10 (FIG. 1) in digital modulation mode. In this mode, digital modem interface 54 reads/writes a CELP-encoded packet every twenty milliseconds.

Referring again to FIG. 1, dual-mode interface buffer 24 is used to transfer voice samples from a codec (not-shown) to dual-mode voiceband signal processor 20 at a nominal sample rate (8 ksps) during all operational modes. For transfers from a codec (not shown), dual-mode interface buffer 24 functions in a 20 ms processing mode during operation in the digital modulation mode, and in a 0.25 ms and 1 ms processing modes during operation in the FM and hybrid FM modes, respectively. In a preferred implementation, dual-mode interface buffer 24 is realized using a RAM, sample counters, and control logic.

During processing of voice samples, dual-mode interface buffer 24 receives samples from a codec (not shown) at a nominal rate of 8 ksps. The arrival of each sample is indicated by a word sync signal. Upon capture, the sample is transferred to RAM in dual-mode interface buffer 24. The transfer from the capture buffer to the RAM may be accomplished through DMA or other conventional techniques. However, the captured sample must arrive at the RAM before the subsequent word sync signal. In digital modulation mode, the service request (ENC_REQ) is provided to dual-mode voiceband signal processor 20 by control logic within dual-mode interface buffer 24 upon accumulation of the requisite number of samples within the RAM of dual-mode interface buffer 24. In an exemplary digital modulation mode, the requisite number of samples is approximately 160 for the ENC_REQ signal. In FM mode, the service request is generated by FM_REQ control 726 (FIG. 9) rather than by the control logic of dual-mode interface buffer 24. Also, during FM mode it is necessary that 8 samples be so accumulated for 1 ms mode and that 2 samples be similarly accumulated for 0.25 ms mode. Relative frequency lock must be maintained between the word syncs (described above) and external timing received by timing generator 110 (FIG. 2) for use in generation of the FM_REQ signal in FM_REQ control 726. This relative frequency lock is required to ensure that the codec sample input and output rate is locked to the rate in which TX FM and RX FM samples are processed within dual-mode voiceband signal processor 20.

Similarly, dual-mode interface buffer 24 is used in all operational modes to transfer voice samples at a nominal sample rate (8 ksps) to a codec (not-shown) from dual-mode voiceband signal processor 20. For transfers to a codec (not shown), dual-mode interface buffer 24 functions in a 5 ms processing mode during operation in the digital modulation mode, and in 0.25 ms and 1 ms processing modes during operation in the FM and hybrid FM modes, respectively. Voice samples are output operation by dual-mode interface buffer 24 in the following manner.

In particular, each sample is provided by buffer 24 to the codec—along with a word sync signal—at the exemplary 8 ksps rate. Upon release each of sample, the next sample is transferred from RAM in dual-mode interface buffer 24. The transfer from RAM to the release buffer (not shown) may be accomplished through DMA or other conventional techniques, with the understanding that following each release the next sample must arrive at the release buffer prior to the subsequent word sync signal. Upon removal during digital modulation mode of the requisite number of samples from RAM within dual-mode interface buffer 24, the service request (DEC-REQ) is provided to dual-mode voiceband signal processor 20 by control logic within dual-mode interface buffer 24. In an exemplary digital modulation mode, 40 samples are required for the DEC_REQ signal. The previous description of the preferred embodiments is provided to enable any person skilled in the art to make or use the present invention. The various modifications to these embodiments will be readily apparent to those skilled in the art, and the generic principles defined herein may be applied to other embodiments without the use of inventive faculty. Thus, the present invention is not intended to be limited to the embodiments shown herein but is to be accorded the widest scope consistent with the principles and novel features disclosed herein.

What is claimed is:

1. A dual-mode communications processor comprising:
   a dual-mode signal processor having an input port for receiving digitized data, said signal processor performing first and second signal processing operations upon said digitized data received during operation in first and second modes, respectively, said signal processor alternating between said first and second signal processing operations when in a hybrid mode;
   a digital modulation network, coupled to said dual-mode signal processor, for generating digital modulation data using said digitized data processed by said dual-mode signal processor during said first mode;
   a narrowband modulator, coupled to said dual-mode signal processor, for generating narrowband modulation data using said digitized data processed by said dual-mode signal processor during said second mode; and
   a controller for selecting between operation in said first and second modes.

2. The dual-mode communications processor of claim 1 further including:
   a first processing interface connected between said digital modulation network and a first output port of said dual-mode signal processor, and
   a second processing interface connected between said narrowband modulator and a second output port of said signal processor.

3. The dual-mode communications processor of claim 1 wherein said dual-mode signal processor includes a dual-mode input buffer, said digitized data being read into said dual-mode input buffer during both of said first and second modes.

4. The dual-mode communications processor of claim 1 wherein said controller configures said dual-mode signal processor differently during operation in said first and second modes, thereby facilitating switching between processing in said first and second modes within said dual-mode signal processor.

5. The dual-mode communications processor of claim 1 wherein said narrowband modulator comprises an FM modulator for generating an FM modulation waveform using said digitized data processed by said dual-mode signal processor during said first mode.

6. The dual-mode communications processor of claim 1 wherein said digital modulation network comprises a code-division multiple access (CDMA) modulator for encoding said digitized data processed by said dual-mode signal processor during said second mode.

7. A dual-mode integrated circuit communications processor for use in a communications device comprising:

a dual-mode signal processor having an input port for receiving digitized data, said signal processor functioning as a vocoder during operation of said device in a digital modulation mode and as an FM processor during operation of said device in an FM mode, said signal processor alternating between vocoding and FM processing when in a hybrid mode;

a digital modulation network, coupled to said dual-mode signal processor, for generating digital modulation data using said digitized data processed by said dual-mode signal processor during said digital modulation mode;

an FM modulator, coupled to said dual-mode signal processor, for generating FM modulation data using said digitized data processed by said dual-mode signal processor during said FM mode; and a controller for selecting between operation in said digital modulation and FM modes.

8. A dual-mode integrated circuit modem for use in a communications device comprising:

a dual-mode signal processor having first and second signal ports, said signal processor performing:
  (i) first and second signal processing operations upon digitized data transmitted by said communications device during operation of said device in first and second modes, respectively;
  (ii) the converse of said first and second signal processing operations upon digitized data received by said communications device during operation of said device in first and second modes, respectively; and
  (iii) alternating between said first and second signal processing operations during operation in a hybrid mode;

a digital modulation modem disposed to exchange digital information with said dual-mode signal processor through said first signal port during operation of said device in said first mode;

a narrowband modem disposed to exchange digital information with said dual-mode signal processor through said second signal port during operation of said device in said second mode; and a controller for selecting between operation in said first and second modes.

9. A dual-mode communications processor for use in a communications device comprising:

a dual-mode signal processor having first and second ports for receiving digitized data, said signal processor performing a first and second signal processing operations upon digitized data during operation in first and second modes, respectively, said signal processor alternating between said first and second signal processing operations when in a hybrid mode; pl a digital demodulation network, coupled to said first port, for generating said digitized data in response to information signals received by said communications device during operation in said first mode;

a narrowband demodulator, coupled to said second port, for generating said digitized data in response to information signals received by said communications device during operation in said second mode;

a controller for selecting between operation in said first and second modes.

10. The dual-mode communications processor of claim 9 further including:

a first processing interface connected between said digital demodulation network and said first port of said dual-mode signal processor, and a second processing interface connected between said narrowband demodulator and said second port of said signal processor.

11. The dual-mode communications processor of claim 9 further including a dual-mode interface connected to a third port of said dual-mode signal processor, said digitized data processed by said dual-mode signal processor being read into said dual-mode interface during both of said first and second modes.

12. The dual-mode communications processor of claim 9 wherein said controller maintains time alignment between said first and second modes in order to facilitate switching between processing in said first and second modes within said dual-mode signal processor.

13. The dual-mode communications processor of claim 9 wherein said narrowband demodulator comprises an FM demodulator.

14. The dual-mode communications processor of claim 9 wherein said digital demodulation network comprises a code-division multiple access (CDMA) demodulator.

15. In an dual-mode communications device, an integrated circuit dual-mode communications processor comprising:

a dual-mode signal processor having at least first and second signal ports, said signal processor being configured as:
  a vocoder during operation of said communications device in a digital modulation mode, and as
  an FM filter during operation of said communications device in an FM mode;
  said signal processor alternating between operating as said vocoder and said FM filter during operation of said communication device in a hybrid mode;

a digital modulation modem processor disposed to exchange digital information with said dual-mode signal processor through said first signal port during operation of said device in said digital modulation mode;

an FM modem processor disposed to exchange digital information with said dual-mode signal processor through said second signal port during operation of said device in said FM mode; and a controller for selecting between operation in said first and second modes.

16. In dual-mode communications device, a dual-mode signal processing network comprising:

digital processor means for performing a vocoding operation during operation of said dual-mode communications device in a first mode and for performing a predefined signal processing function during operation of said device in a second mode, and for alternating between performing said vocoding operation and said predefined signal processing function during operation of said device in a hybrid mode;

a dual-mode interface, connected to a first port of said digital processor means, for transferring digitized speech samples to and from said digital processor means during operation in said first and second modes;

a first processing interface, connected to a second port of said digital processor means, through which digitally encoded information is transferred during operation of said device in said first mode; and a second processing interface, connected to a third port of said digital processor means, through which digital FM data is transferred during operation of said device in said second mode.

17. The dual-mode signal processing network of claim 16 wherein said digital processor means includes:

a DSP core for performing, during operation of said device in said first mode, a recursive convolution computation and for providing a result of said recursive convolution computation, and a minimization processor for performing a minimization search in accordance with said result of said recursive convolution computation.

18. The dual-mode signal processing network of claim 16 wherein said second mode comprises an FM mode, and wherein said predefined signal processing function includes an FM filtering operation.

* * * * *